US011881101B2

(12) United States Patent
Ran et al.

(10) Patent No.: US 11,881,101 B2
(45) Date of Patent: *Jan. 23, 2024

(54) INTELLIGENT ROAD SIDE UNIT (RSU) NETWORK FOR AUTOMATED DRIVING

(71) Applicant: CAVH LLC, Fitchburg, WI (US)

(72) Inventors: Bin Ran, Fitchburg, WI (US); Yang Cheng, Middleton, WI (US); Tianyi Chen, Madison, WI (US); Shen Li, Madison, WI (US); Kunsong Shi, Madison, WI (US); Yifan Yao, Madison, WI (US); Keshu Wu, Madison, WI (US); Zhen Zhang, Madison, WI (US); Fan Ding, Madison, WI (US); Huachun Tan, Madison, WI (US); Yuankai Wu, Madison, WI (US); Shuoxuan Dong, Madison, WI (US); Linhui Ye, Basking Ridge, NJ (US); Xiaotian Li, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,903

(22) Filed: May 11, 2022

(65) Prior Publication Data

US 2022/0343755 A1 Oct. 27, 2022

Related U.S. Application Data

(63) Continuation of application No. 16/776,846, filed on Jan. 30, 2020, now Pat. No. 11,430,328, which is a (Continued)

(51) Int. Cl.
*G08G 1/01* (2006.01)
*G08G 1/0967* (2006.01)

(Continued)

(52) U.S. Cl.
CPC ......... *G08G 1/0116* (2013.01); *G08G 1/0145* (2013.01); *G08G 1/0968* (2013.01);

(Continued)

(58) Field of Classification Search
CPC ............... G08G 1/0116; G08G 1/0145; G08G 1/096725; G08G 1/0968; G08G 1/164; G08G 1/166; G08G 1/167

(Continued)

(56) References Cited

U.S. PATENT DOCUMENTS

| | | | |
|---|---|---|---|
| 3,824,469 | A | 7/1974 | Ristenbatt |
| 4,023,017 | A | 5/1977 | Ceseri |

(Continued)

FOREIGN PATENT DOCUMENTS

| | | | |
|---|---|---|---|
| CN | 103854473 | A | 6/2014 |
| CN | 104485003 | B | 4/2015 |

(Continued)

OTHER PUBLICATIONS

Al-Najada et al., "Autonomous vehicles safe-optimal trajectory selection based on big data analysis and predefined user preferences," 2016 IEEE 7th Annual Ubiquitous Computing, Electronics & Mobile Communication Conference (UEMCON), New York, NY, 2016, pp. 1-6.

(Continued)

*Primary Examiner* — Mahmoud S Ismail
(74) *Attorney, Agent, or Firm* — Casimir Jones, S.C.; Thomas A. Isenbarger

(57) ABSTRACT

The invention provides systems and methods for an Intelligent Road Infrastructure System (IRIS), which facilitates vehicle operations and control for connected automated vehicle highway (CAVH) systems. IRIS systems and methods provide vehicles with individually customized information and real-time control instructions for vehicle to fulfill (Continued)

the driving tasks such as car following, lane changing, and route guidance. IRIS systems and methods also manage transportation operations and management services for both freeways and urban arterials. In some embodiments, the IRIS comprises or consists of one of more of the following physical subsystems: (1) Roadside unit (RSU) network, (2) Traffic Control Unit (TCU) and Traffic Control Center (TCC) network, (3) vehicle onboard unit (OBU), (4) traffic operations centers (TOCs), and (5) cloud information and computing services. The IRIS manages one or more of the following function categories: sensing, transportation behavior prediction and management, planning and decision making, and vehicle control. IRIS is supported by real-time wired and/or wireless communication, power supply networks, and cyber safety and security services.

38 Claims, 22 Drawing Sheets

Related U.S. Application Data continuation of application No. 16/135,916, filed on Sep. 19, 2018, now Pat. No. 10,692,365, which is a continuation-in-part of application No. 15/628,331, filed on Jun. 20, 2017, now Pat. No. 10,380,886.

(60) Provisional application No. 62/627,005, filed on Feb. 6, 2018.

(51) Int. Cl.
*G08G 1/0968* (2006.01)
*G08G 1/16* (2006.01)

(52) U.S. Cl.
CPC ....... *G08G 1/096725* (2013.01); *G08G 1/164* (2013.01); *G08G 1/166* (2013.01); *G08G 1/167* (2013.01)

(58) Field of Classification Search
USPC .......................................................... 701/117
See application file for complete search history.

(56) References Cited

U.S. PATENT DOCUMENTS

| | | | |
|---|---|---|---|
| 4,704,610 | A | 11/1987 | Smith et al. |
| 4,962,457 | A | 10/1990 | Chen et al. |
| 5,420,794 | A | 5/1995 | James |
| 5,504,683 | A | 4/1996 | Gurmu |
| 5,625,559 | A | 4/1997 | Egawa |
| 5,732,785 | A | 3/1998 | Ran et al. |
| 6,028,537 | A | 2/2000 | Suman et al. |
| 6,064,318 | A | 5/2000 | Kirchner, III et al. |
| 6,317,682 | B1 | 11/2001 | Ogura et al. |
| 6,829,531 | B2 | 12/2004 | Lee |
| 6,900,740 | B2 | 5/2005 | Bloomquist et al. |
| 7,295,904 | B2 | 11/2007 | Kanevsky et al. |
| 7,324,893 | B2 | 1/2008 | Yamashita et al. |
| 7,343,243 | B2 | 3/2008 | Smith |
| 7,382,274 | B1 | 6/2008 | Kermani et al. |
| 7,418,346 | B2 | 6/2008 | Breed et al. |
| 7,421,334 | B2 | 9/2008 | Dahlgren et al. |
| 7,425,903 | B2 | 9/2008 | Boss et al. |
| 7,554,435 | B2 | 6/2009 | Tengler et al. |
| 7,725,249 | B2 | 5/2010 | Kickbusch |
| 7,860,639 | B2 | 12/2010 | Yang |
| 7,894,951 | B2 | 2/2011 | Norris et al. |
| 7,979,172 | B2 | 7/2011 | Breed |
| 8,352,112 | B2 | 1/2013 | Mudalige |
| 8,527,139 | B1 | 9/2013 | Yousuf |
| 8,589,070 | B2 | 11/2013 | Ban |
| 8,630,795 | B2 | 1/2014 | Breed et al. |
| 8,682,511 | B2 | 3/2014 | Andreasson |
| 8,972,080 | B2 | 3/2015 | Shida et al. |
| 9,053,636 | B2 | 6/2015 | Gordon |
| 9,076,332 | B2 | 7/2015 | Myr |
| 9,120,485 | B1 | 9/2015 | Dolgov |
| 9,182,951 | B1 | 11/2015 | Ormerod et al. |
| 9,349,055 | B1 | 5/2016 | Ogale |
| 9,494,935 | B2 | 11/2016 | Okumura et al. |
| 9,495,874 | B1 | 11/2016 | Zhu et al. |
| 9,595,190 | B2 | 3/2017 | McCrary |
| 9,646,496 | B1 | 5/2017 | Miller et al. |
| 9,654,511 | B1 | 5/2017 | Brocco et al. |
| 9,665,101 | B1 | 5/2017 | Templeton |
| 9,731,713 | B2 | 8/2017 | Horii |
| 9,799,224 | B2 | 10/2017 | Okamoto |
| 9,845,096 | B2 | 12/2017 | Urano et al. |
| 9,940,840 | B1 | 4/2018 | Schubert et al. |
| 9,964,948 | B2 | 5/2018 | Ullrich et al. |
| 10,074,223 | B2 | 9/2018 | Newman |
| 10,074,273 | B2 | 9/2018 | Yokoyama et al. |
| 10,380,886 | B2 | 8/2019 | Ran et al. |
| 2002/0008637 | A1 | 1/2002 | Lemelson et al. |
| 2003/0045995 | A1* | 3/2003 | Lee .................. G08G 1/096741 701/439 |
| 2004/0145496 | A1 | 7/2004 | Ellis |
| 2004/0230393 | A1 | 11/2004 | Tzamaloukas |
| 2005/0060069 | A1 | 3/2005 | Breed et al. |
| 2005/0102098 | A1 | 5/2005 | Montealegre et al. |
| 2005/0209769 | A1 | 9/2005 | Yamashita et al. |
| 2005/0222760 | A1 | 10/2005 | Cabral et al. |
| 2006/0142933 | A1 | 6/2006 | Feng |
| 2006/0226968 | A1* | 10/2006 | Tengler ............ G08G 1/096741 340/466 |
| 2006/0251498 | A1 | 11/2006 | Buzzoni et al. |
| 2007/0093997 | A1 | 4/2007 | Yang et al. |
| 2007/0146162 | A1 | 6/2007 | Tengler et al. |
| 2008/0042815 | A1 | 2/2008 | Breed et al. |
| 2008/0095163 | A1 | 4/2008 | Chen et al. |
| 2008/0150786 | A1 | 6/2008 | Breed |
| 2008/0161986 | A1* | 7/2008 | Breed ..................... G01S 19/51 701/23 |
| 2008/0161987 | A1 | 7/2008 | Breed |
| 2008/0275646 | A1 | 11/2008 | Perng et al. |
| 2010/0013629 | A1 | 1/2010 | Sznaider et al. |
| 2010/0256836 | A1 | 10/2010 | Mudalige et al. |
| 2011/0224892 | A1 | 9/2011 | Speiser |
| 2011/0227757 | A1 | 9/2011 | Chen et al. |
| 2012/0017262 | A1 | 1/2012 | Kapoor et al. |
| 2012/0022776 | A1* | 1/2012 | Razavilar ........... G01C 21/3697 707/769 |
| 2012/0029799 | A1* | 2/2012 | Miller ...................... G08G 1/08 701/117 |
| 2012/0059574 | A1 | 3/2012 | Hada |
| 2012/0105639 | A1 | 5/2012 | Stein et al. |
| 2012/0143786 | A1 | 6/2012 | Karner |
| 2012/0283910 | A1 | 11/2012 | Lee et al. |
| 2012/0303807 | A1 | 11/2012 | Akelbein et al. |
| 2013/0116915 | A1 | 5/2013 | Ferreira et al. |
| 2013/0137457 | A1 | 5/2013 | Potkonjak |
| 2013/0138714 | A1 | 5/2013 | Ricci |
| 2013/0141580 | A1 | 6/2013 | Stein et al. |
| 2013/0204484 | A1 | 8/2013 | Ricci |
| 2013/0218412 | A1 | 8/2013 | Ricci |
| 2013/0297140 | A1 | 11/2013 | Montemerlo et al. |
| 2013/0297196 | A1 | 11/2013 | Shida |
| 2014/0112410 | A1* | 4/2014 | Yokoyama ........... H04J 11/0023 375/285 |
| 2014/0219505 | A1 | 8/2014 | Kindo et al. |
| 2014/0222322 | A1 | 8/2014 | Durekovic |
| 2014/0278026 | A1 | 9/2014 | Taylor |
| 2014/0278052 | A1 | 9/2014 | Slavin et al. |
| 2014/0354451 | A1 | 12/2014 | Tonguz et al. |
| 2015/0153013 | A1 | 6/2015 | Zhao et al. |
| 2015/0169018 | A1 | 6/2015 | Rogö et al. |
| 2015/0197247 | A1 | 7/2015 | Ichinowaka |

(56) References Cited

U.S. PATENT DOCUMENTS

| | | | |
|---|---|---|---|
| 2015/0199685 A1 | 7/2015 | Betancourt et al. | |
| 2015/0211868 A1 | 7/2015 | Matsushita et al. | |
| 2015/0310742 A1 | 10/2015 | Albornoz | |
| 2016/0042303 A1 | 2/2016 | Medina et al. | |
| 2016/0059855 A1* | 3/2016 | Rebhan | B60W 30/0956 701/41 |
| 2016/0086391 A1 | 3/2016 | Ricci | |
| 2016/0110820 A1 | 4/2016 | Fleck et al. | |
| 2016/0132705 A1 | 5/2016 | Kovarik et al. | |
| 2016/0142492 A1 | 5/2016 | Fang et al. | |
| 2016/0148440 A1 | 5/2016 | Kwak | |
| 2016/0216130 A1 | 7/2016 | Abramson et al. | |
| 2016/0221186 A1 | 8/2016 | Perrone | |
| 2016/0231746 A1 | 8/2016 | Hazelton et al. | |
| 2016/0236683 A1* | 8/2016 | Eggert | G08G 1/166 |
| 2016/0238703 A1 | 8/2016 | Liu et al. | |
| 2016/0325753 A1 | 11/2016 | Stein et al. | |
| 2016/0328272 A1 | 11/2016 | Ahmed et al. | |
| 2016/0330036 A1 | 11/2016 | Zhou et al. | |
| 2016/0370194 A1 | 12/2016 | Colijn et al. | |
| 2017/0026893 A1 | 1/2017 | Lagassey | |
| 2017/0039435 A1 | 2/2017 | Ogale et al. | |
| 2017/0046883 A1 | 2/2017 | Gordon et al. | |
| 2017/0053529 A1 | 2/2017 | Yokoyama et al. | |
| 2017/0075195 A1 | 3/2017 | Stein et al. | |
| 2017/0085632 A1 | 3/2017 | Cardote | |
| 2017/0090994 A1 | 3/2017 | Jubinski et al. | |
| 2017/0109644 A1 | 4/2017 | Nariyambut Murali et al. | |
| 2017/0131435 A1 | 5/2017 | Peacock et al. | |
| 2017/0206783 A1 | 7/2017 | Miller | |
| 2017/0262790 A1 | 9/2017 | Khasis | |
| 2017/0276492 A1 | 9/2017 | Ramasamy | |
| 2017/0324817 A1 | 11/2017 | Oliveir A et al. | |
| 2017/0337571 A1 | 11/2017 | Bansal et al. | |
| 2017/0339224 A1 | 11/2017 | Condeixa et al. | |
| 2017/0357980 A1 | 12/2017 | Bakun et al. | |
| 2018/0018216 A1 | 1/2018 | Halford et al. | |
| 2018/0018877 A1 | 1/2018 | Townsend | |
| 2018/0018888 A1 | 1/2018 | Townsend | |
| 2018/0053413 A1 | 2/2018 | Patil et al. | |
| 2018/0065637 A1 | 3/2018 | Bassindale | |
| 2018/0114079 A1 | 4/2018 | Myers et al. | |
| 2018/0151064 A1 | 5/2018 | Xu et al. | |
| 2018/0158327 A1 | 6/2018 | Gärtner | |
| 2018/0190116 A1 | 7/2018 | Bauer et al. | |
| 2018/0262887 A1* | 9/2018 | Futaki | H04W 36/38 |
| 2018/0299274 A1 | 10/2018 | Moghe et al. | |
| 2018/0308344 A1 | 10/2018 | Ravindranath et al. | |
| 2018/0336780 A1 | 11/2018 | Ran et al. | |
| 2019/0244518 A1 | 8/2019 | Yang et al. | |
| 2019/0244521 A1 | 8/2019 | Ran et al. | |

FOREIGN PATENT DOCUMENTS

| | | | |
|---|---|---|---|
| CN | 102768768 | B | 3/2016 |
| CN | 106710203 | A | 5/2017 |
| CN | 107665578 | A | 2/2018 |
| CN | 107807633 | A | 3/2018 |
| CN | 108039053 | A | 5/2018 |
| CN | 108447291 | A | 8/2018 |
| EP | 2395472 | A1 | 12/2011 |
| KR | 20170008703 | A | 1/2017 |
| WO | WO 2015/114592 | A1 | 8/2015 |
| WO | WO 2016/077027 | A1 | 5/2016 |
| WO | WO 2016/135561 | A1 | 9/2016 |
| WO | WO 2017/049978 | A1 | 3/2017 |
| WO | WO 2017/079474 | A2 | 5/2017 |
| WO | WO 2017/115342 | A1 | 7/2017 |
| WO | WO 2017/160276 | A1 | 9/2017 |
| WO | WO 2018/039134 | A1 | 3/2018 |
| WO | WO 2018/132378 | | 7/2019 |
| WO | WO 2019/156955 | A1 | 8/2019 |
| WO | WO 2019/156956 | A1 | 8/2019 |

OTHER PUBLICATIONS

APGDT002, Microchip Technology Inc. http://www.microchip.com/, retrieved on: Nov. 3, 2017, 2 pages.

Automated Driving Systems Issued Jan. 2014-01, downloaded Sep. 17, 2019, 12 pages.

Autonomous Vehicles: A Policy Review Purdue Policy Research Institute, Feb. 2018, retrieved on Sep. 3, 2019, retrived from the interned: <URL:https://www.purdue.edu/discoverypark/ppri/docs/CATV%20Policy%20Writeup%20Feb%202018.pdf> pp. 1-17.

Berhenhem et al. "Overview of Platooning Systems", ITS World Congress, Vienna, Oct. 22-26, 2012, 8 pages.

Bhat "Travel Modeling in an Era of Connected and Automated Transportation Systems: An Investigation in the Dallas—Fort Worth Area," Technical Report 122, Center for Transportation Research, Feb. 2017 [retrieved on Sep. 3, 2019]. Retrieved from the Internet: <URL:http://www.caee.utexas.edu/prof/bhat/REPORTS/DSTOP_122.pdf> pp. 1-61.

Conduent™—Toll Collection SolutionsConduent™—Toll Collection Solutions, https://www.conduent.com/solution/transportation-solutions/electronic-toll-collection/, retrived on: Nov. 3, 2017, 3 pages.

Doshi "Review of the book Security for Cloud Storage Systems" MEFHI, Gauridad Campus, India, 2014, pp. 1-2 [retrieved on Sep. 5, 2019]. Retrieved from the Internet: <URL:https://www.iacr.org/books/2014_sp_yang_cloudstorage.pdf.

EyEQ4 from Mobileye, http://www.mobileye.com/our-technology, retrieved on Nov. 3, 2017, 6 pages.

Fehr-Peers "Effect of Next Generation Vehicles on Travel Demand and Highway, Capacity," FP Thinkg: Effects of Next-Generation Vehicles on Travel Demand and Highway Capacity Feb. 2014, [retrieved on Jun. 13, 2019]. Retrived from the Internet: <URL:http://www.fehrandpeers.com/wp-content/uploads/2015/07/FP_Thing_Next_Gen_White_Paper_FINAL.pdf>pp. 1-39.

Flammini et al. "Wireless sensor networking in the internet of things and cloud computing era." Procedia Engineering 87 (2014): 672-679.

Fleetmatics, https://www.fleetmatics.com/, retrieved on: Nov. 3, 2017, 6 pages.

HDL-64E of Velodyne Lidar, http://velodynelidar.com/index.html, retrieved on: Nov. 3, 2017, 10 pages.

Here, https://here.com/en/products-services/products/here-hd-live-map, retrieved on: Nov. 3, 2017, 5 pages.

International Search Report of related PCT/US2018/012961, dated May 10, 2018, 16 pages.

International Search Report of related PCT/US2019/016603, dated Apr. 24, 2019, 17 pages.

International Search Report of related PCT/US2019/016606, dated Apr. 23, 2019, 21 pages.

International Search Report of related PCT/US2019/026569, dated Jul. 8, 33 pages.

International Search Report of related PCT/US2019/031304, dated Aug. 9, 2019, 17 pages.

International Search Report of related PCT/US2019/037963, dated Sep. 10, 2019, 54 pages.

International Search Report of related PCT/US2019/039376, dated Oct. 29, 2019, 11 pages.

International Search Report of related PCT/US2019/040809, dated Nov. 15, 2019, 17 pages.

International Search Report of related PCT/US2019/040814, dated Oct. 8, 2019, 20 pages.

International Search Report of related PCT/US2019/040819, dated Oct. 17, 2019, 41 pages.

International Search Report of related PCT/US2019/041004, dated Oct. 3, 2019, 18 pages.

International Search Report of related PCT/US2019/041008, dated Oct. 8, 2019, 16 pages.

Johri et al., "A Multi-Scale Spatiotemporal Perspective of Connected and Automated Vehicles: Applications and Wireless Networking," in IEEE Intelligent Transportation Systems Magazine, vol. 8, No. 2, pp. 65-73, Summer 2016.

Maaß et al., "Data Processing of High-rate low-voltage Distribution Grid Recordings for Smart Grid Monitoring and Analysis," Maab et

(56) References Cited

OTHER PUBLICATIONS al. EURASIP Journal on Advances in Signal Processing (2015) 2015:14 DOI 10.1186/s13634-015-02034[retrieved on Sep. 3, 2019]. Retrieved from the Internet: <URL:https://link.springer.com/content/pdf/10.1186%2Fs13634-015-0203-4.pdf> pp. 1-21.

Miami Dade Transportation Planning Organization "First Mile-Last Mile Options with Hight Trip Generator Employers." MiamiDadeTPO.org. pp. 1-99 Jan. 31, 2018. [retrieved on Jun. 13, 2019]. Retrieved from the Internet:<URL:http://www.miamidadetpo.org/library/studies/first-mile-last-mile-options-with-high-trip-generator-employers-2017-12.pdf>.

MK5 V2X ,Cohda Wireless,http://cohdawireless.com, retrieved on: Nov. 3, 2017, 2 pages.

National Association of City Transportation Officials. "Blueprint for Autonomous Urbanism", New York, NY10017, www.nacto.org, Fall 2017, [retrieved on Sep. 5, 2019]. Retrieved from the Internet: <URL:https://natco.org/wp-content/uploads/2017/11/BAU_Mod1_raster-sm.pdf>.

Optical Fiber from Cablesys, https://www.cablesys.com/fiber-patch-cables/?gclid=Cj0KEQjwldzHBRCfg_aImKrf7N4BEiQABJTPKH_q2wbjNLGBhBVQVSBogLQMkDaQdMm5rZtyBaE8uuUaAhTJ8P8HAQ, retrieved on: Nov. 3, 2017, 10 pages.

Portland "Portland Metro are Value Pricing Feasibility Analysis" Oregon Department of Transportation, Jan. 23, 2018, pp. 1-29, [retrieved on Jun. 13, 2019]. Retrieved from the Internet: <URL:https://www.oregon.gov/ODOT/KOM/VP-TM2-InitialConcepts.PDF>.

Products for Toll Collection—Mobility—SiemensProducts for Toll Collection—Mobility—Siemens, https://www.mobility.siemens.com/mobility/global/en/urban-mobility/road-solutions/toll-systems-for-cities/products-for-toll-collection.aspx, retrieved on: Nov. 3, 2017, 2 pages.

R-Fans_16 from Beijing Surestar Technology Co. Ltd, http://www.isurestar.com/index.php/en-product-product/html#9, retrieved on: Nov. 3, 2017, 7 pages.

Society of Automotive Engineers International's new standard J3016: "(R) Taxonomy and Definitions for Terms Related to Driving Automation Systems for On-Road Motor Vehicles" Revised Sep. 2016, downloaded Dec. 12, 2016, 30 pages.

Society of Automotive Engineers International's new standard J3016: "(R) Taxonomy and Definitions for Terms Related to Driving Automation Systems for On-Road Motor Vehicles" 2016, downloaded Dec. 12, 2016, 30 pages.

Southwest Research Institute, Basic Infrastructure Message Development and Standards Support for Connected Vehicles Applications {retrived on Sep. 3, 2019}. Retrieved from the Internet: <URL:http://www.cts.virginia.edu/wp-content/uploads/2018/12/Task4-Basic-Infrastructure-Message-Development-20180425-Final.pdf> pp. 1-76p.

STJ1-3 from Sensortech, http://www.whsensortech.com/, retrieved on Nov. 3, 2017, 2 pages.

StreetWAVE from Savari, http://savari.net/technology/road-side-unit, retrieved on: Nov. 3, 2017, 2 pages.

Surakitbanharn "Connected and Autonomous Vehicles: A Policy Review" Purdue Policy Research Institute, Feb. 2018, retrieved on Sep. 3, 2019, retrived from the interned: <URL:https://www.purdue.edu/discoverypark/ppri/docs/CATV%20Policy%20Writeup%20Feb%202018.pdf> pp. 1-17.

TDC-GPX2 LIDAR of precision-measurement-technologies, http://pmt-fl.com, retrieved on: Nov. 3, 2017, 2 pages.

Teletrac Navman, http://drive.teletracnavman.com/, retrived on: Nov. 3, 2017, 2 pages.

Vector CANalyzer9.0 from vector, https://vector.com, retrieved on Nov. 3, 2017, 1 page.

Williams "Transportation Planning Implications of Automated/Connected Vehicle son Texas Highways" Texas A&M Transportation Institute, Apr. 2017, 34 pages.

Extended European Search Report for EP 19751572.9, dated Jan. 14, 2022, 10 pages.

First Examination Report for IN App. No. 202017033659, dated Apr. 28, 2022, 6 pages.

* cited by examiner

Physical Connection

Flow of Data

INTELLIGENT ROAD SIDE UNIT (RSU) NETWORK FOR AUTOMATED DRIVING

This application is a continuation of and claims priority to U.S. patent application Ser. No. 16/776,846, filed Jan. 30, 2020, which is a continuation of U.S. patent application Ser. No. 16/135,916, filed Sep. 19, 2018, which claims priority to U.S. Provisional Pat. App. Ser. No. 62/627,005, filed Feb. 6, 2018 and is a continuation-in-part of and claims priority to U.S. patent application Ser. No. 15/628,331, filed Jun. 20, 2017, now U.S. Pat. No. 10,380,886, issued Aug. 13, 2019, each of which of the foregoing is incorporated herein by reference in its entirety.

FIELD

The present invention relates to an intelligent road infrastructure system providing transportation management and operations and individual vehicle control for connected and automated vehicles (CAV), and, more particularly, to a system controlling CAVs by sending individual vehicles with customized, detailed, and time-sensitive control instructions and traffic information for automated vehicle driving, such as vehicle following, lane changing, route guidance, and other related information.

BACKGROUND

Autonomous vehicles, vehicles that are capable of sensing their environment and navigating without or with reduced human input, are in development. At present, they are in experimental testing and not in widespread commercial use. Existing approaches require expensive and complicated on-board systems, making widespread implementation a substantial challenge.

Alternative systems and methods that address these problems are described in U.S. patent application Ser. No. 15/628,331, filed Jun. 20, 2017, and U.S. Provisional Patent Application Ser. No. 62/626,862, filed Feb. 6, 2018, the disclosures which is herein incorporated by reference in its entirety (referred to herein as a CAVH system).

The invention provides systems and methods for an Intelligent Road Infrastructure System (IRIS), which facilitates vehicle operations and control for connected automated vehicle highway (CAVH) systems. IRIS systems and methods provide vehicles with individually customized information and real-time control instructions for vehicle to fulfill the driving tasks such as car following, lane changing, and route guidance. IRIS systems and methods also manage transportation operations and management services for both freeways and urban arterials.

SUMMARY

The invention provides systems and methods for an Intelligent Road Infrastructure System (IRIS), which facilitates vehicle operations and control for connected automated vehicle highway (CAVH) systems. IRIS systems and methods provide vehicles with individually customized information and real-time control instructions for vehicle to fulfill the driving tasks such as car following, lane changing, and route guidance. IRIS systems and methods also manage transportation operations and management services for both freeways and urban arterials.

In some embodiments, the IRIS comprises or consists of one of more of the following physical subsystems: (1) Roadside unit (RSU) network, (2) Traffic Control Unit (TCU) and Traffic Control Center (TCC) network, (3) vehicle onboard unit (OBU), (4) traffic operations centers (TOCs), and (5) cloud information and computing services. The IRIS manages one or more of the following function categories: sensing, transportation behavior prediction and management, planning and decision making, and vehicle control. IRIS is supported by real-time wired and/or wireless communication, power supply networks, and cyber safety and security services.

The present technology provides a comprehensive system providing full vehicle operations and control for connected and automated vehicle and highway systems by sending individual vehicles with detailed and time-sensitive control instructions. It is suitable for a portion of lanes, or all lanes of the highway. In some embodiments, those instructions are vehicle-specific and they are sent by a lowest level TCU, which are optimized and passed from a top level TCC. These TCC/TCUs are in a hierarchical structure and cover different levels of areas.

In some embodiments, provided herein are systems and methods comprising: an Intelligent Road Infrastructure System (IRIS) that facilitates vehicle operations and control for a connected automated vehicle highway (CAVH). In some embodiments, the systems and methods provide individual vehicles with detailed customized information and time-sensitive control instructions for vehicle to fulfill the driving tasks such as car following, lane changing, route guidance, and provide operations and maintenance services for vehicles on both freeways and urban arterials. In some embodiments, the systems and methods are built and managed as an open platform; subsystems, as listed below, in some embodiments, are owned and/or operated by different entities, and are shared among different CAVH systems physically and/or logically, including one or more of the following physical subsystems:

a. Roadside unit (RSU) network, whose functions include sensing, communication, control (fast/simple), and drivable ranges computation;
b. Traffic Control Unit (TCU) and Traffic Control Center (TCC) network;
c. Vehicle onboard units (OBU) and related vehicle interfaces;
d. Traffic operations centers; and
e. Cloud based platform of information and computing services.

In some embodiments, the systems and methods manage one or more of the following function categories:

a. Sensing;
b. Transportation behavior prediction and management;
c. Planning and decision making; and
d. Vehicle control.

In some embodiments, the systems and methods are supported by one or more of the following:

a. Real-time Communication via wired and wireless media;
b. Power supply network; and
c. Cyber safety and security system.

In some embodiments, the function categories and physical subsystems of IRIS have various configurations in terms of function and physic device allocation. For example, in some embodiments a configuration comprises:

a. RSUs provide real-time vehicle environment sensing and traffic behavior prediction, and send instantaneous control instructions for individual vehicles through OBUs;
b. TCU/TCC and traffic operation centers provides short-term and long-term transportation behavior prediction and management, planning and decision making, and collecting/processing transportation information with or without cloud information and computing services;

c. The vehicle OBUs, as above, collect vehicle generated data, such as vehicle movement and condition and send to RSUs, and receive inputs from the RSUs. Based on the inputs from RSU, OBU facilitates vehicle control. When the vehicle control system fails, the OBU may take over in a short time period to stop the vehicle safely. In some embodiments, the vehicle OBU contains one or more of the following modules: (1) a communication module, (2) a data collection module and (3) a vehicle control module. Other modules may also be included.

In some embodiments, a communication module is configured for data exchange between RSUs and OBUs, and, as desired, between other vehicle OBUs. Vehicle sourced data may include, but is not limit to:

a. Human input data, such as: origin-destination of the trip, expected travel time, expected start and arrival time, and service requests;
b. Human condition data, such as human behaviors and human status (e.g., fatigue level); and
c. Vehicle condition data, such as vehicle ID, type, and the data collected by the data collection module.

Data from RSUs may include, but is not limit to:

a. Vehicle control instructions, such as: desired longitudinal and lateral acceleration rate, desired vehicle orientation;
b. Travel route and traffic information, such as: traffic conditions, incident, location of intersection, entrance and exit; and
c. Services data, such as: fuel station, point of interest.

In some embodiments, a data collection module collects data from vehicle installed external and internal sensors and monitors vehicle and human status, including but not limited to one or more of:

a. Vehicle engine status;
b. Vehicle speed;
c. Surrounding objects detected by vehicles; and
d. Human conditions.

In some embodiments, a vehicle control module is used to execute control instructions from an RSU for driving tasks such as, car following and lane changing.

In some embodiments, the sensing functions of an IRIS generate a comprehensive information at real-time, short-term, and long-term scale for transportation behavior prediction and management, planning and decision-making, vehicle control, and other functions. The information includes but is not limited to:

a. Vehicle surrounding, such as: spacing, speed difference, obstacles, lane deviation;
b. Weather, such as: weather conditions and pavement conditions;
c. Vehicle attribute data, such as: speed, location, type, automation level;
d. Traffic state, such as: traffic flow rate, occupancy, average speed;
e. Road information, such as: signal, speed limit; and
f. Incidents collection, such as: occurred crash and congestion.

In some embodiments, the IRIS is supported by sensing functions that predict conditions of the entire transportation network at various scales including but not limited to:

a. Microscopic level for individual vehicles, such as: longitudinal movements (car following, acceleration and deceleration, stopping and standing), lateral movements (lane keeping, lane changing);
b. Mesoscopic level for road corridor and segments, such as: special event early notification, incident prediction, weaving section merging and diverging, platoon splitting and integrating, variable speed limit prediction and reaction, segment travel time prediction, segment traffic flow prediction; and
c. Macroscopic level for the road network, such as: potential congestions prediction, potential incidents prediction, network traffic demand prediction, network status prediction, network travel time prediction.

In some embodiments, the IRIS is supported by sensing and prediction functions, realizes planning and decision-making capabilities, and informs target vehicles and entities at various spacious scales including, but not limited to:

a. Microscopic level, such as longitudinal control (car following, acceleration and deceleration) and lateral control (lane keeping, lane changing);
b. Mesoscopic level, such as: special event notification, work zone, reduced speed zone, incident detection, buffer space, and weather forecast notification. Planning in this level ensures the vehicle follows all stipulated rules (permanent or temporary) to improve safety and efficiency; and
c. Macroscopic level, such as: route planning and guidance, network demand management.

In some embodiments, the planning and decision-making functions of IRIS enhance reactive measures of incident management and support proactive measures of incident prediction and prevention, including but not limited to:

a. For reactive measures, IRIS detects occurred incidents automatically and coordinate related agencies for further actions. It will also provide incident warnings and rerouting instructions for affected traffic; and
b. For proactive measures, IRIS predicts potential incidents and sends control instructions to lead affected vehicles to safety, and coordinate related agencies for further actions.

In some embodiments, the IRIS vehicle control functions are supported by sensing, transportation behavior prediction and management, planning and decision making, and further include, but are not limit to the following:

a. Speed and headway keeping: keep the minimal headway and maximal speed on the lane to reach the max possible traffic capacity;
b. Conflict avoidance: detects potential accident/conflicts on the lane, and then sends a warning message and conflict avoid instructions to vehicles. Under such situations, vehicles must follow the instructions from the lane management system;
c. Lane keeping: keep vehicles driving on the designated lane;
d. Curvature/elevation control: make sure vehicles keep and adjust to the proper speed and angle based on factors such as road geometry, pavement condition;
e. Lane changing control: coordinate vehicles lane changing in proper orders, with the minimum disturbance to the traffic flow;
f. System boundary control: vehicle permission verification before entering, and system takeover and handoff mechanism for vehicle entering and exiting, respectively;
g. Platoon control and fleet management;
h. System failure safety measures: (1) the system provides enough response time for a driver or the vehicle to take over the vehicle control during a system fail, or (2) other measures to stop vehicles safely; and i. Task priority management: providing a mechanism to prioritize various control objectives.

In some embodiments, the RSU has one or more module configurations including, but not limited to:

a. Sensing module for driving environment detection;
b. Communication module for communication with vehicles, TCUs and cloud via wired or wireless media;
c. Data processing module that processes the data from the sensing and communication module;
d. Interface module that communicates between the data processing module and the communication module; and
e. Adaptive power supply module that adjusts power delivery according to the conditions of the local power grid with backup redundancy.

In some embodiments, a sensing module includes one or more of the flowing types of sensors:

a. Radar based sensors that work with vision sensor to sense driving environment and vehicle attribute data, including but not limited to:
   i. LiDAR;
   ii. Microwave radar;
   iii. Ultrasonic radar; and
   iv. Millimeter radar;
b. Vision based sensors that work with radar based sensors to provide driving environment data, including but not limited to:
   i. Color camera;
   ii. Infrared camera for night time; and
   iii. Thermal camera for night time;
c. Satellite based navigation system that work with inertial navigation system to support vehicle locating, including but not limited to:
   i. DGPS; and
   ii. BeiDou System;
d. inertial navigation system that work with the satellite based navigation system to support vehicle locating, including but not limited to an inertial reference unit; and
e. Vehicle identification devices, including but not limited to RFID.

In some embodiments, the RSUs are installed and deployed based on function requirements and environment factors, such as road types, geometry and safety considerations, including but not limited to:

a. Some modules are not necessarily installed at the same physical location as the core modules of RSUs;
b. RSU spacing, deployment and installation methods may vary based on road geometry to archive maximal coverage and eliminate detection blind spots. Possible installation locations include but not limited to: freeway roadside, freeway on/off ramp, intersection, roadside buildings, bridges, tunnels, roundabouts, transit stations, parking lots, railroad crossings, school zones; and
c. RSU are installed on:
   i. Fixed locations for long-term deployment; and
   ii. Mobile platforms, including but not limited to: cars and trucks, unmanned aerial vehicles (UAVs), for short-term or flexible deployment.

In some embodiments, RSUs are deployed on special locations and time periods that require additional system coverage, and RSU configurations may vary. The special locations include, but are not limited to:

a. Construction zones;
b. Special events, such as sports games, street fairs, block parties, concerts; and
c. Special weather conditions such as storms, heavy snow.

In some embodiments, the TCCs and TCUs, along with the RSUs, may have a hierarchical structure including, but not limited to:

a. Traffic Control Center (TCC) realizes comprehensive traffic operations optimization, data processing and archiving functionality, and provides human operations interfaces. A TCC, based on the coverage area, may be further classified as macroscopic TCC, regional TCC, and corridor TCC;
b. Traffic Control Unit (TCU), realizes real-time vehicle control and data processing functionality, that are highly automated based on preinstalled algorithms. A TCU may be further classified as Segment TCU and point TCUs based on coverage areas; and
c. A network of Road Side Units (RSUs), that receive data flow from connected vehicles, detect traffic conditions, and send targeted instructions to vehicles, wherein the point or segment TCU can be physically combined or integrated with an RSU.

In some embodiments, the cloud based platform provides the networks of RSUs and TCC/TCUs with information and computing services, including but not limited to:

a. Storage as a service (STaaS), meeting additional storage needs of IRIS;
b. Control as a service (CCaaS), providing additional control capability as a service for IRIS;
c. Computing as a service (CaaS), providing entities or groups of entities of IRIS that requires additional computing resources; and
d. Sensing as a service (SEaaS), providing additional sensing capability as a service for IRIS.

The systems and methods may include and be integrated with functions and components described in U.S. Provisional Patent Application Ser. No. 62/626,862, filed Feb. 6, 2018, herein incorporated by reference in its entirety.

In some embodiments, the systems and methods provide a virtual traffic light control function. In some such embodiments, a cloud-based traffic light control system, characterized by including sensors in road side such as sensing devices, control devices and communication devices. In some embodiments, the sensing components of RSUs are provided on the roads (e.g, intersections) for detecting road vehicle traffic, for sensing devices associated with the cloud system over a network connection, and for uploading information to the cloud system. The cloud system analyzes the sensed information and sends information to vehicles through communication devices.

In some embodiments, the systems and methods provide a traffic state estimation function. In some such embodiments, the cloud system contains a traffic state estimation and prediction algorithm. A weighted data fusion approach is applied to estimate the traffic states, the weights of the data fusion method are determined by the quality of information provided by sensors of RSU, TCC/TCU and TOC. When the sensor is unavailable, the method estimates traffic states on predictive and estimated information, guaranteeing that the system provides a reliable traffic state under transmission and/or vehicle scarcity challenges.

In some embodiments, the systems and methods provide a fleet maintenance function. In some such embodiments, the cloud system utilizes its traffic state estimation and data fusion methods to support applications of fleet maintenance such as Remote Vehicle Diagnostics, Intelligent fuel-saving driving and Intelligent charge/refuel.

In some embodiments, the IRIS contains high performance computation capability to allocate computation power to realize sensing, prediction, planning and decision making, and control, specifically, at three levels:

a. A microscopic level, typically from 1 to 10 milliseconds, such as vehicle control instruction computation;
b. A mesoscopic level, typically from 10 to 1000 milliseconds, such as incident detection and pavement condition notification; and
c. macroscopic level, typically longer than 1 second, such as route computing.

In some embodiments, the IRIS manages traffic and lane management to facilitate traffic operations and control on various road facility types, including but not limited to:

a. Freeway, with methods including but not limited to:
  i. Mainline lane changing management;
  ii. Traffic merging/diverging management, such as on-ramps and off-ramps;
  iii. High-occupancy/Toll (HOT) lanes;
  iv. Dynamic shoulder lanes;
  v. Express lanes;
  vi. Automated vehicle penetration rate management for vehicles at various automation levels; and
  vii. Lane closure management, such as work zones, and incidents; and
b. Urban arterials, with methods including but not limited to:
  i. Basic lane changing management;
  ii. Intersection management;
  iii. Urban street lane closure management; and
  iv. Mixed traffic management to accommodate various modes such as bikes, pedestrians, and buses.

In some embodiments, the IRIS provides additional safety and efficiency measures for vehicle operations and control under adverse weather conditions, including but not limited to:

a. High-definition map service, provided by local RSUs, not requiring vehicle installed sensors, with the lane width, lane approach(left/through/right), grade(degree of up/down), radian and other geometry information;
b. Site-specific road weather information, provided by RSUs supported the
TCC/TCU network and the cloud services; and
c. Vehicle control algorithms designed for adverse weather conditions, supported by site-specific road weather information.

In some embodiments, the IRIS includes security, redundancy, and resiliency measures to improve system reliability, including but not limited to:

a. Security measures, including network security and physical equipment security:
  i. Network security measures, such as firewalls and periodical system scan at various levels; and
  ii. Physical equipment security, such as secured hardware installation, access control, and identification tracker;
b. System redundancy. Additional hardware and software resources standing-by to fill the failed counterparts;
c. System backup and restore, the IRIS system is backed up at various intervals from the whole system level to individual device level. If a failure is detected, recovery at the corresponding scale is performed to restore to the closest backup; and
d. System fail handover mechanism activated when a failure is detected. A higher-level system unit identifies the failure and performance corresponding procedure, to replace and/or restore the failed unit.

Also provided herein are methods employing any of the systems described herein for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

DRAWINGS

FIG. 1 shows exemplary OBU Components. 101: Communication module: that can transfer data between RSU and OBU. 102: Data collection module: that can collect data of the vehicle dynamic and static state and generated by human. 103: Vehicle control module: that can execute control command from RSU. When the control system of the vehicle is damaged, it can take over control and stop the vehicle safely. 104: Data of vehicle and human. 105: Data of RSU.

FIG. 2 shows an exemplary IRIS sensing framework. 201: Vehicles send data collected within their sensing range to RSUs. 202: RSUs collect lane traffic information based on vehicle data on the lane; RSUs share/broadcast their collected traffic information to the vehicles within their range. 203: RSU collects road incidents information from reports of vehicles within its covering range. 204: RSU of the incident segment send incident information to the vehicle within its covering range. 205: RSUs share/broadcast their collected information of the lane within its range to the Segment TCUs. 206: RSUs collect weather information, road information, incident information from the Segment TCUs. 207/208: RSU in different segment share information with each other. 209: RSUs send incident information to the Segment TCUs. 210/211: Different segment TCUs share information with each other. 212: Information sharing between RSUs and CAVH Cloud. 213: Information sharing between Segment TCUs and CAVH Cloud.

FIG. 3 shows an exemplary IRIS prediction framework. 301: data sources comprising vehicle sensors, roadside sensors, and cloud. 302: data fusion module. 303: prediction module based on learning, statistical and empirical algorithms. 304: data output at microscopic, mesoscopic and macroscopic levels.

FIG. 4 shows an exemplary Planning and Decision Making function. 401: Raw data and processed data for three level planning. 402: Planning Module for macroscopic, mesoscopic, and microscopic level planning. 403: Decision Making Module for vehicle control instructions. 404 Macroscopic Level Planning. 405 Mesoscopic Level Planning. 406 Microscopic Level Planning. 407 Data Input for Macroscopic Level Planning: raw data and processed data for macroscopic level planning. 408 Data Input for Mesoscopic Level Planning: raw data and processed data for mesoscopic level planning. 409 Data Input for Microscopic Level Planning: raw data and processed data for microscopic level planning.

Figure 9:
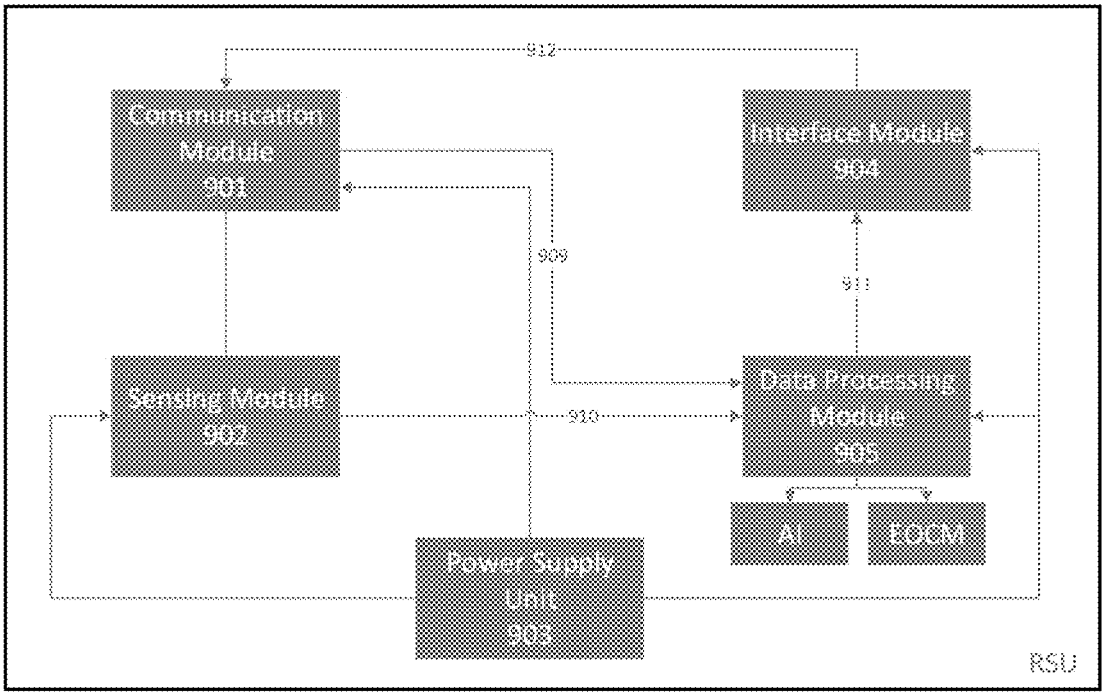
Figure 10:
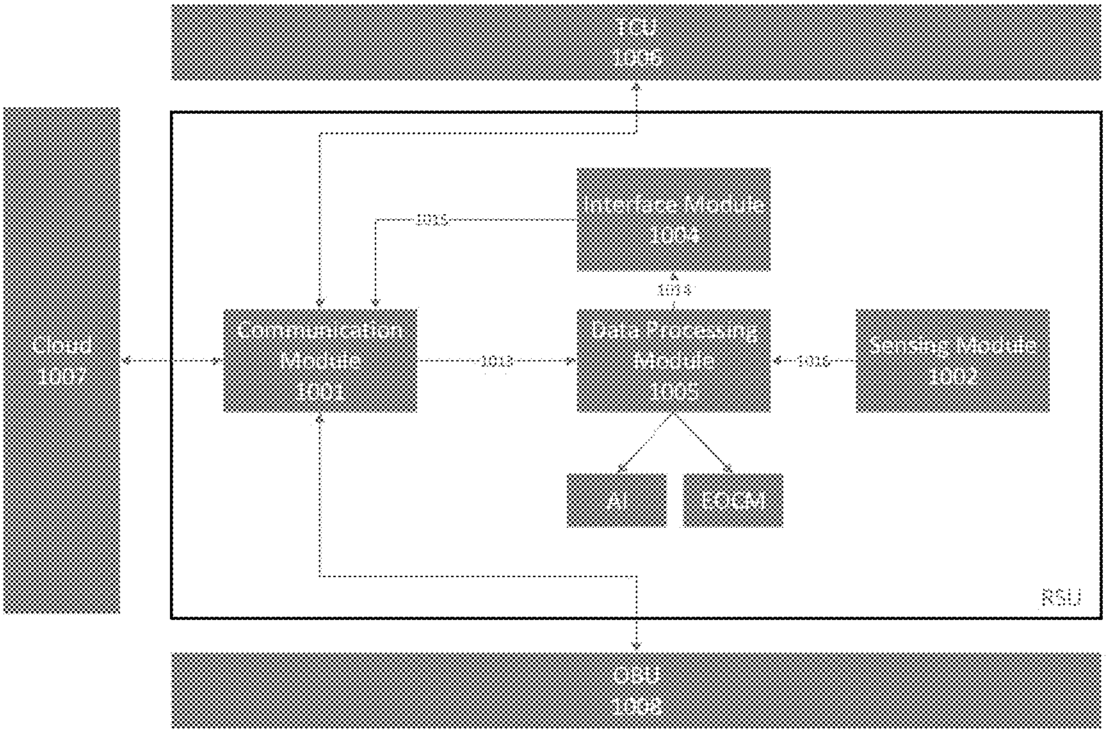

FIG. 9 shows exemplary RSU Physical Components. 901 Communication Module. 902 Sensing Module. 903 Power Supply Unit. 904 Interface Module: a module that communicates between the data processing module and the communication module. 905 Data Processing Module: a module that processes the data. 909: Physical connection of Communication Module to Data Processing Module. 910: Physical connection of Sensing Module to Data Processing Module. 911: Physical connection of Data Processing Module to Interface Module. 912: Physical connection of Interface Module to Communication Module FIG. 10 shows exemplary RSU internal data flows. 1001 Communication Module. 1002 Sensing Module. 1004 Interface Module: a module that communicates between the data processing module and the communication module. 1005 Data Processing Module. 1006 TCU. 1007 Cloud. 1008 OBU. 1013: Data flow from Communication Module to Data Processing Module. 1014: Data flow from Data Processing Module to Interface Module. 1015: Data flow from Interface Module to Communication Module. 1016: Data flow from Sensing Module to Data Processing Module.

Figure 11:
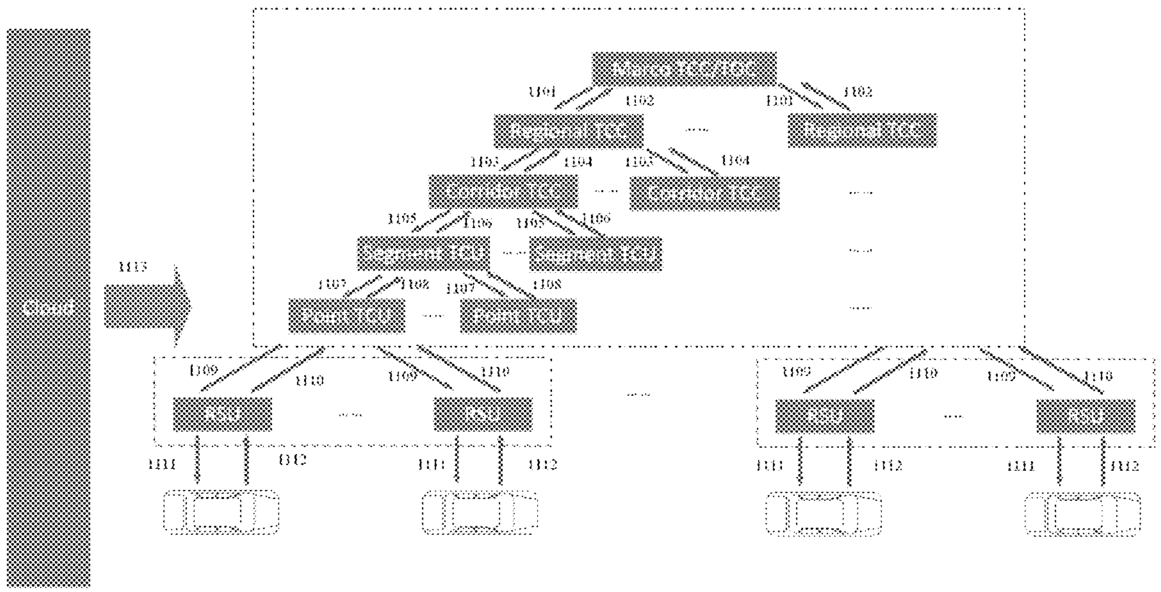

FIG. 11 shows an exemplary TCC/TCU Network Structure. 1101: control targets and overall system information provided by macroscopic TCC to regional TCC. 1102: regional system and traffic information provided by regional TCC to macroscopic TCC. 1103: control targets and regional information provided by regional TCC to corridor TCC. 1104: corridor system and traffic information provided by corridor TCC to regional TCC. 1105: control targets and corridor system information provided by corridor TCC to segment TCU. 1106: segment system and traffic information provided by segment TCU to corridor TCC. 1107: control targets and segment system information provided by segment TCU to point TCU. 1108: point system and traffic information provided by point TCU to corridor TCU. 1109: control targets and local traffic information provided by point TCU to RSU. 1110: RSU status and traffic information provided by RSU to point TCU. 1111: customized traffic information and control instructions from RSU to vehicles. 1112: information provided by vehicles to RSU. 1113: the services provided by the cloud to RSU/TCC-TCU network.

Figure 12:
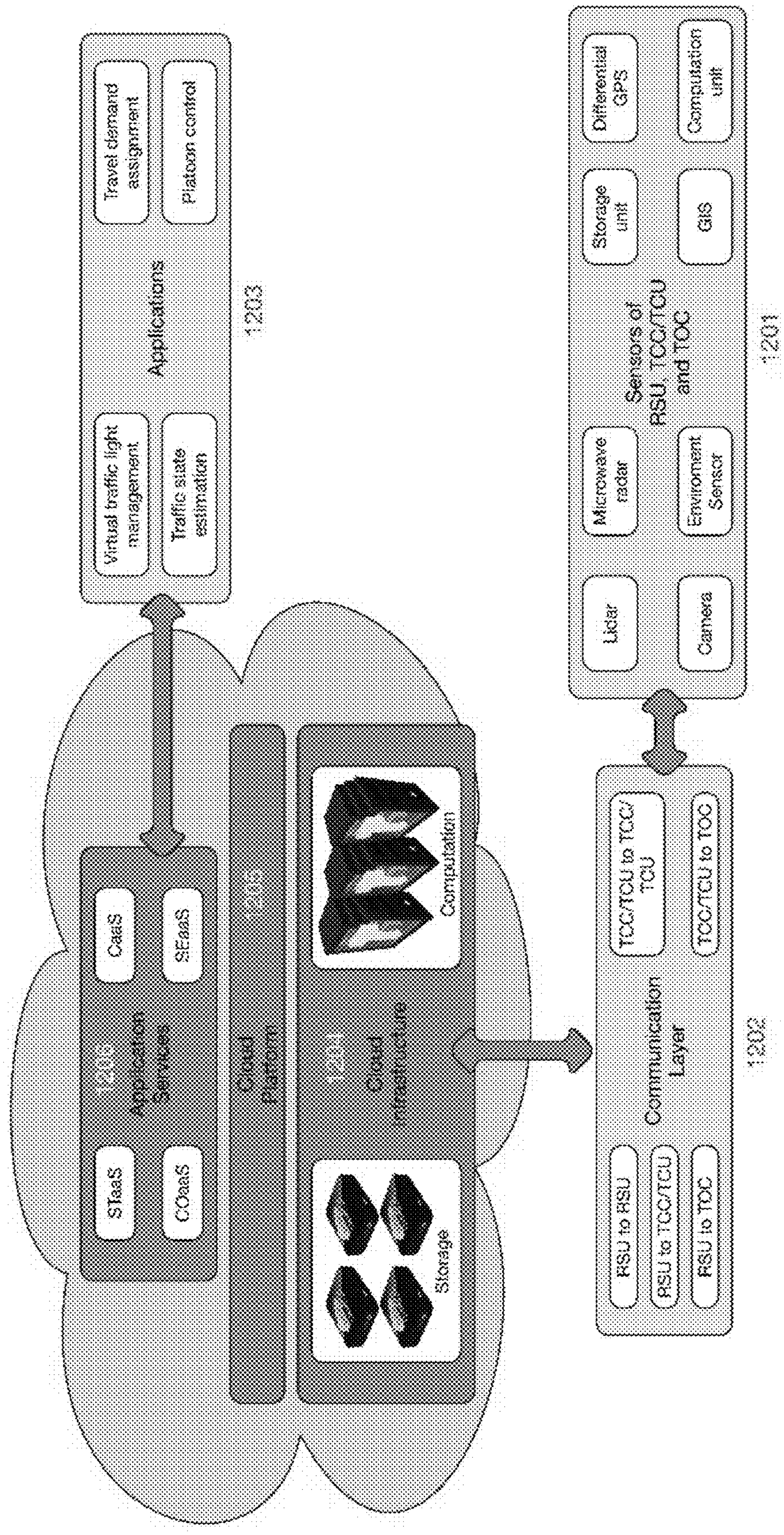

FIG. 12 shows an exemplary architecture of a cloud system.

Figure 13:
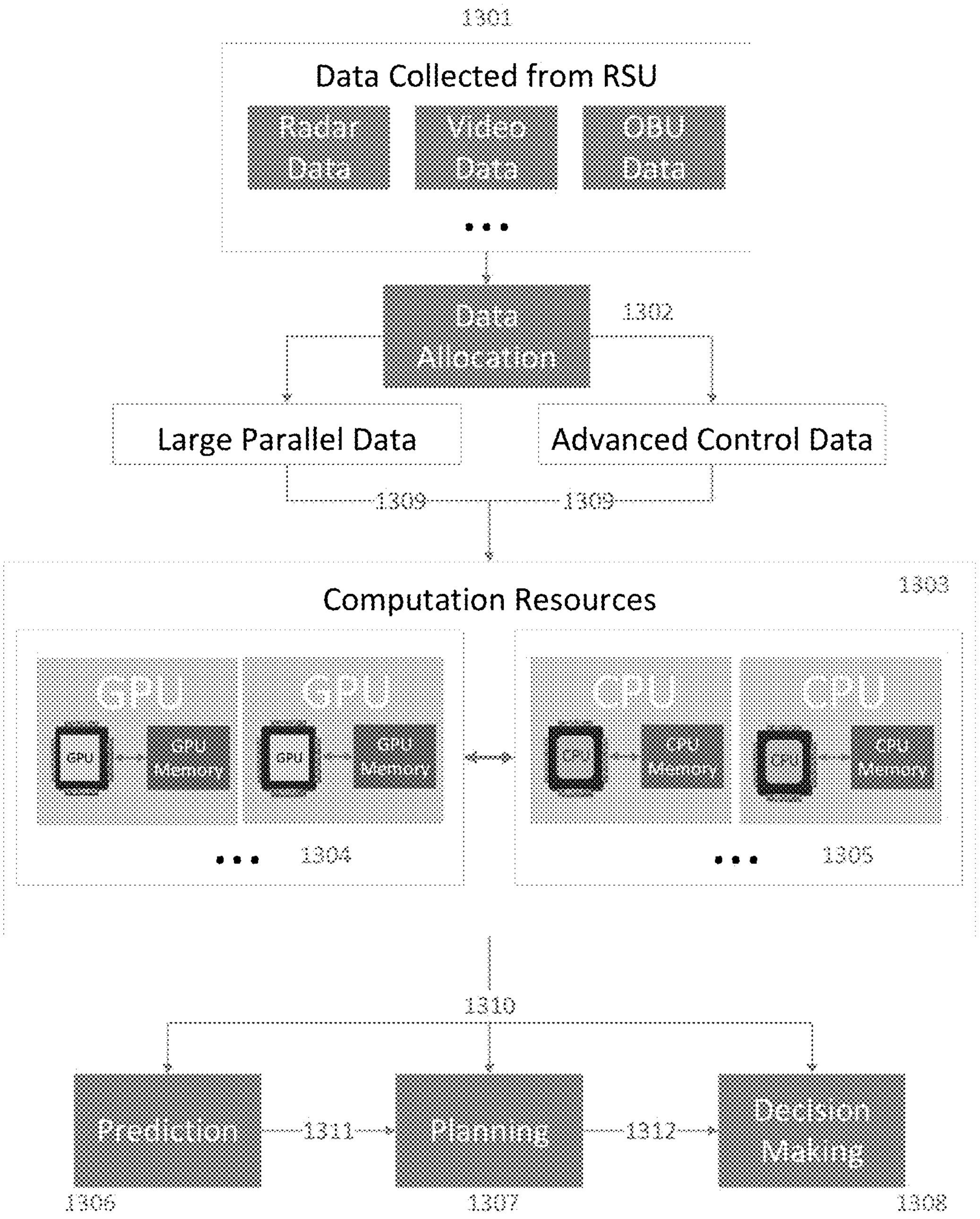

FIG. 13 shows an exemplary IRIS Computation Flowchart. 1301: Data Collected From RSU, including but not limited to image data, video data, radar data, On-board unit data. 1302: Data Allocation Module, allocating computation resources for various data processing. 1303 Computation Resources Module for actual data processing. 1304 GPU, graphic processing unit, mainly for large parallel data. 1305 CPU, central processing unit, mainly for advanced control data. 1306 Prediction module for IRIS prediction functionality. 1307 Planning module for IRIS planning functionality. 1308 Decision Making for IRIS decision-making functionality. 1309 data for processing with computation resource assignment. 1310 processed data for prediction module, planning module, decision making module. 1311 results from prediction module to planning module. 1312 results from planning module to decision making module.

Figure 14:
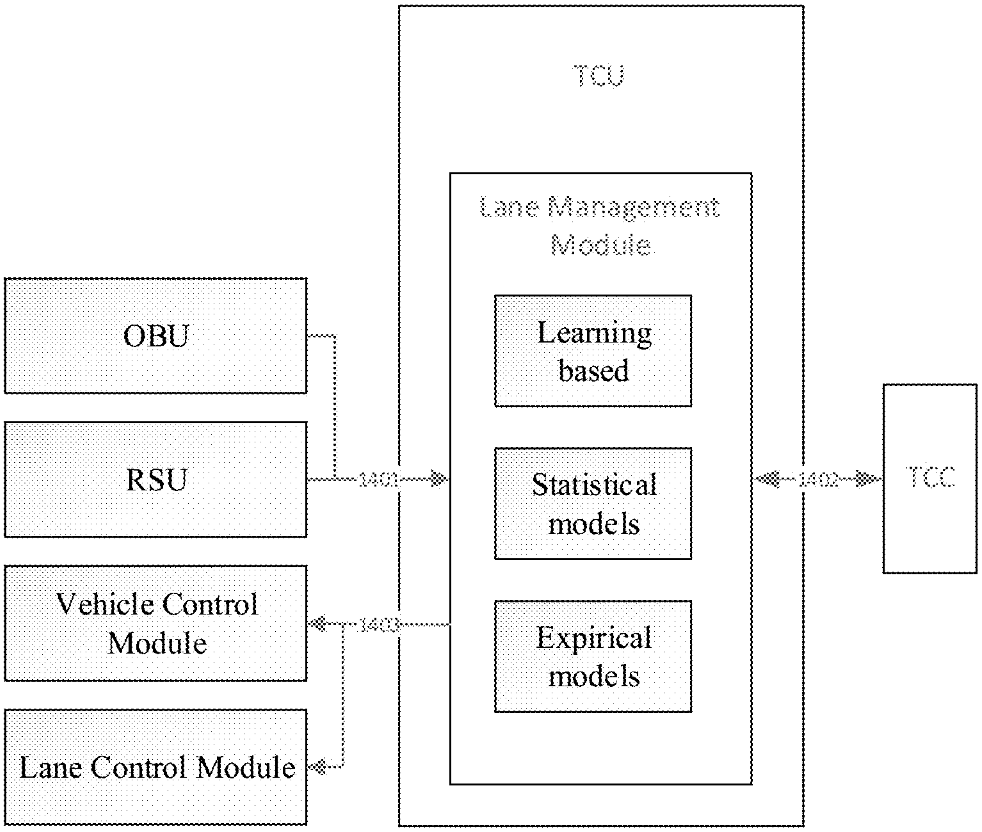

FIG. 14 shows an exemplary Traffic and Lane Management Flowchart. 1401 Lane management related data collected by RSU and OBU. 1402 Control target and traffic information from upper level IRIS TCU/TCC network. 1403 Lane management and control instructions.

Figure 15:
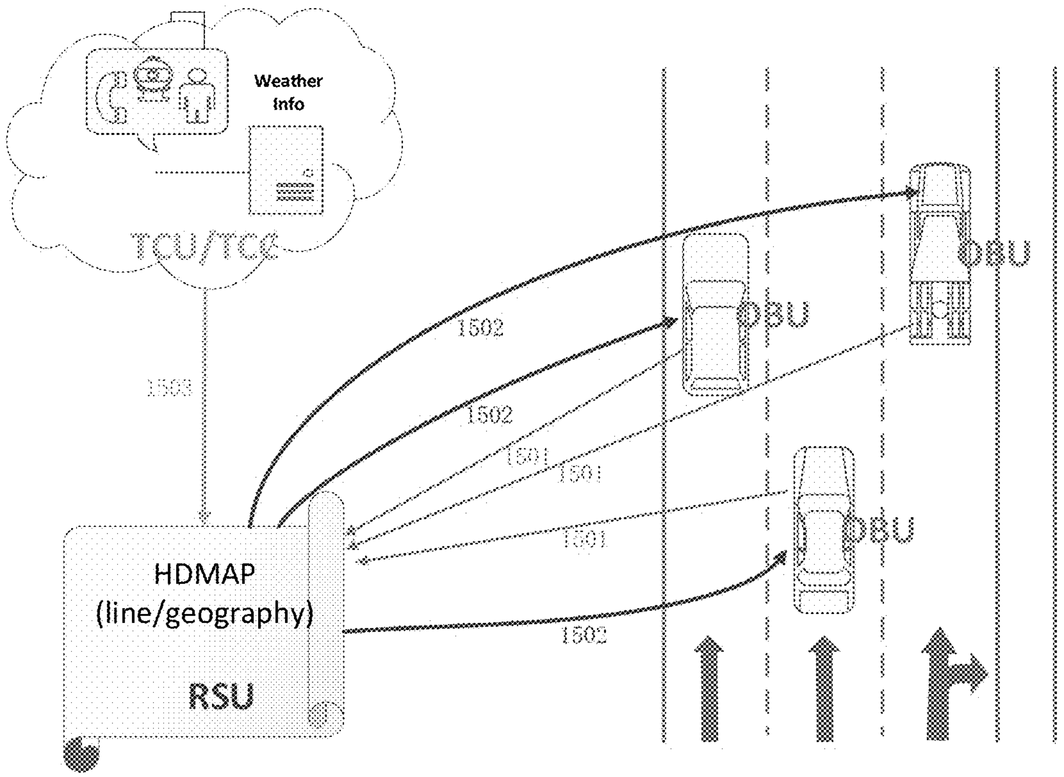

FIG. 15 shows an exemplary Vehicle Control in Adverse Weather component. 1501: vehicle status, location and sensor data. 1502: comprehensive weather and pavement condition data and vehicle control instructions. 1503: wide area weather and traffic information obtained by the TCU/TCC network.

Figure 16:
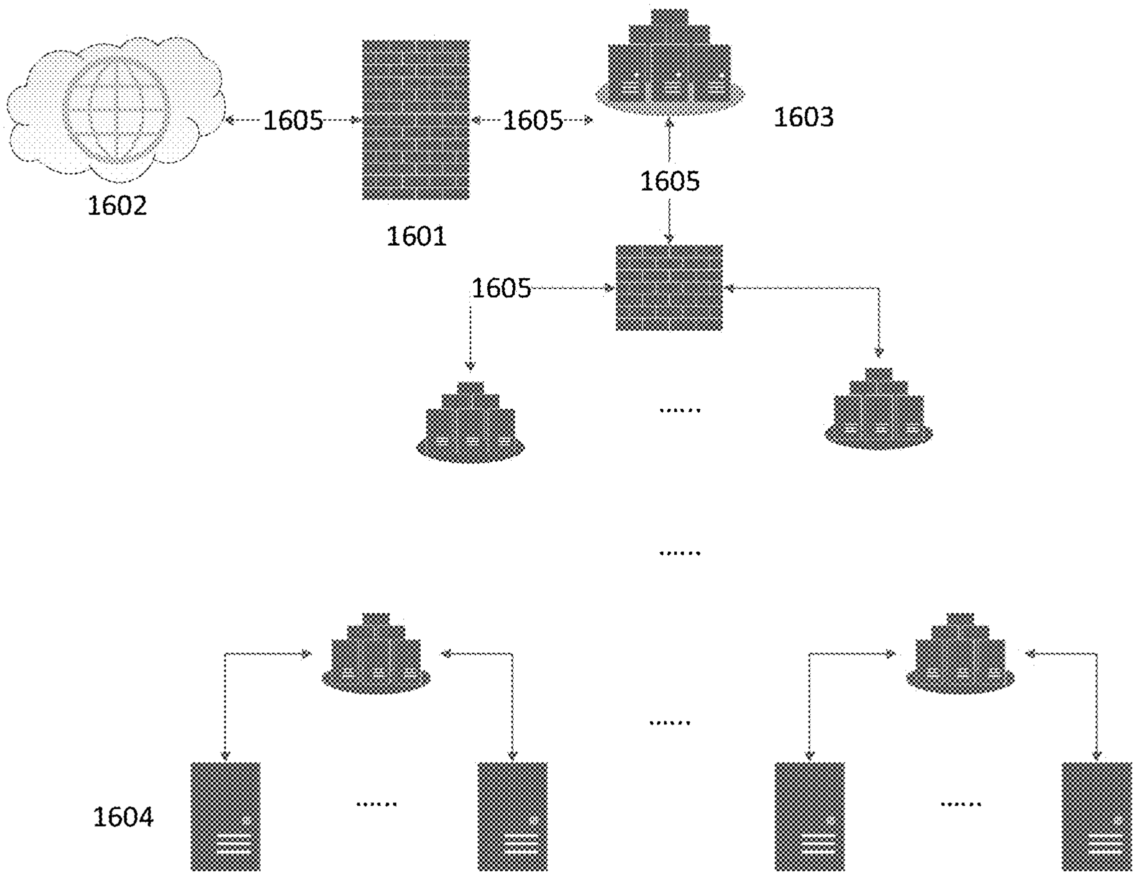

FIG. 16 shows an exemplary IRIS System Security Design. 1601: Network firewall. 1602: Internet and outside services. 1603: Data center for data services, such as data storage and processing. 1604: Local server. 1605: Data transmission flow.

Figure 17:
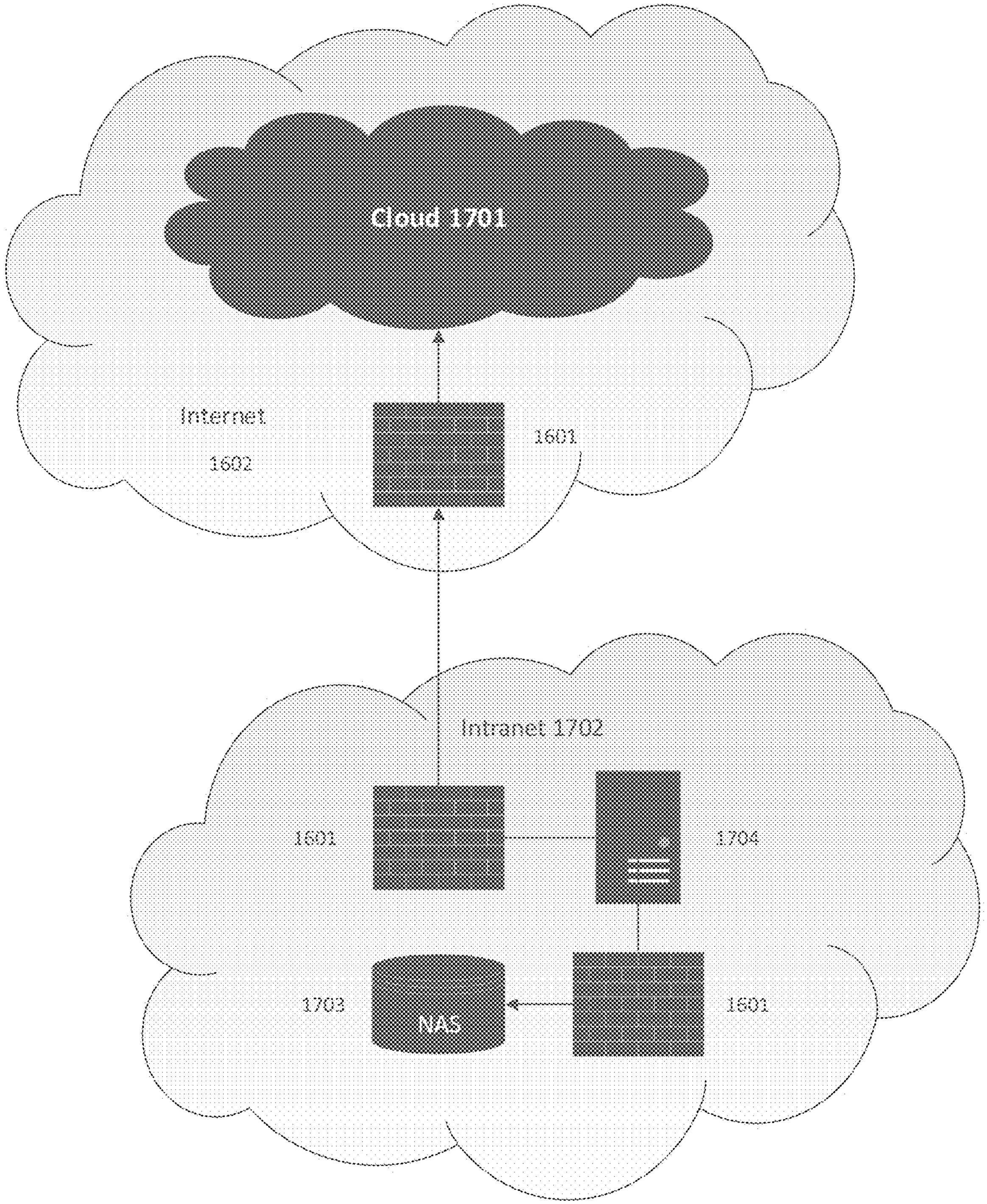

FIG. 17 shows an exemplary IRIS System Backup and Recovery component. 1701: Cloud for data services and other services. 1702: Intranet. 1703: Local Storage for backup. 1704: any IRIS devices, i.e. RSU, TCU, or TCC.

Figure 18:
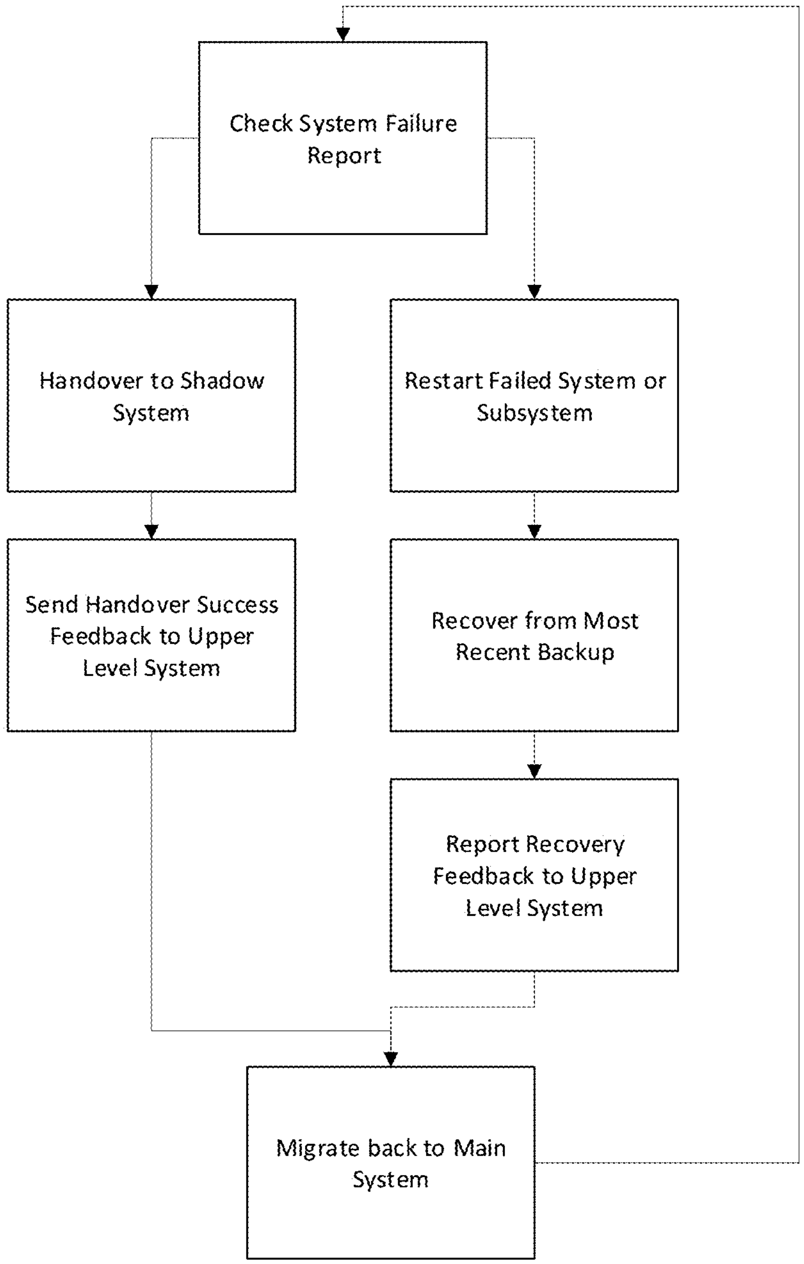

FIG. 18 shows an exemplary System Failure Management component.

Figure 19:
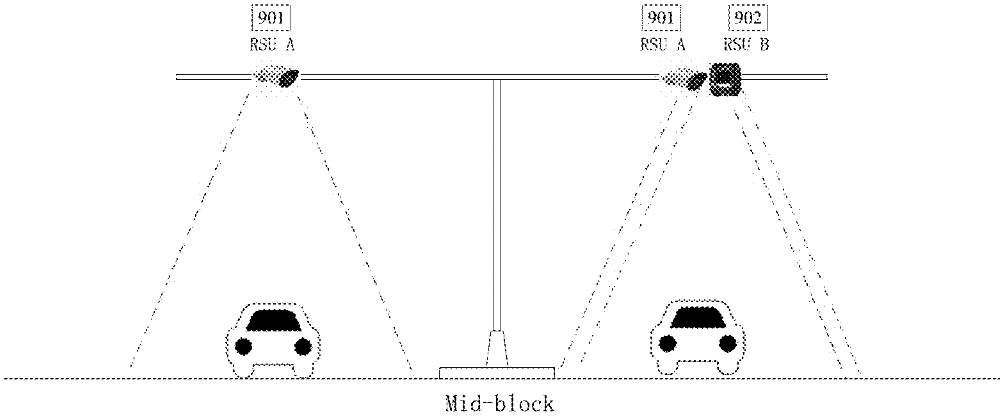

FIG. 19 shows a sectional view of an exemplary RSU deployment.

Figure 20:
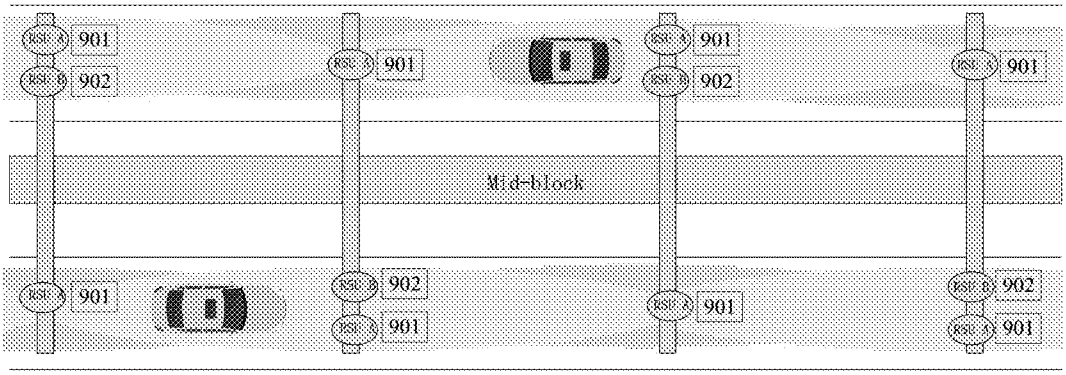

FIG. 20 shows a top view of an exemplary RSU deployment.

Figure 21:
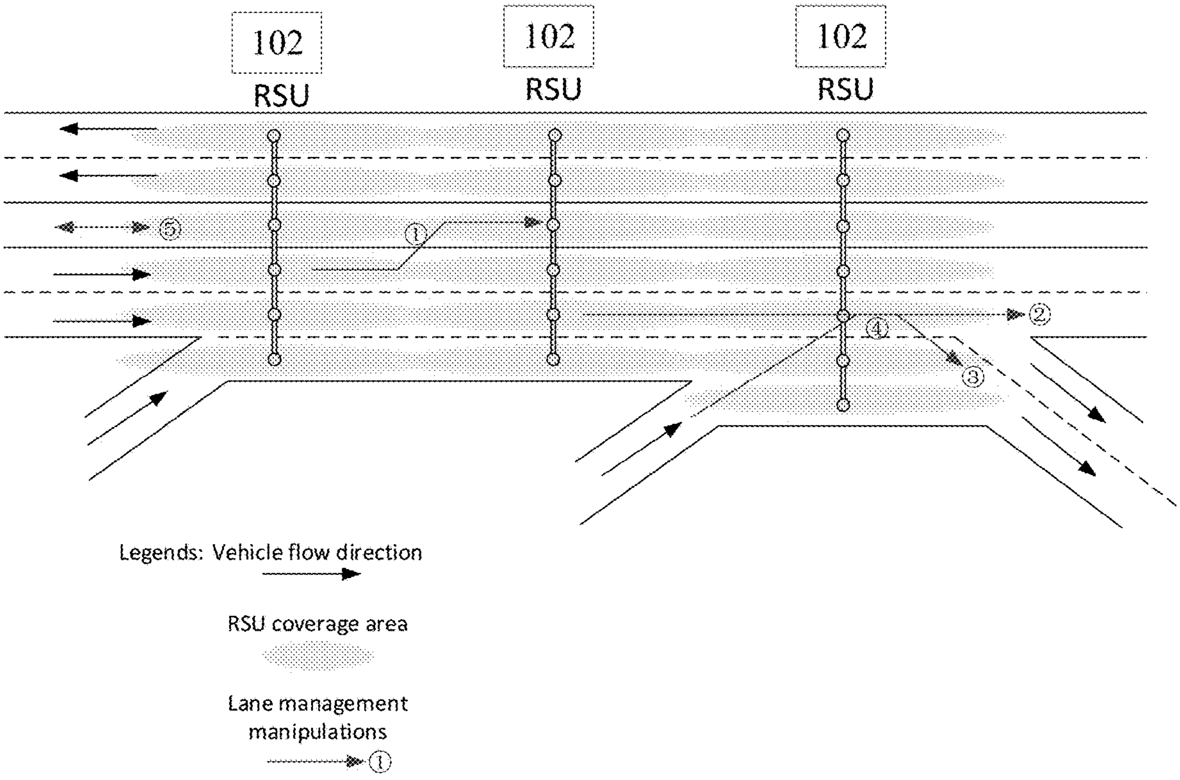

FIG. 21 shows exemplary RSU lane management on a freeway segment.

Figure 22:
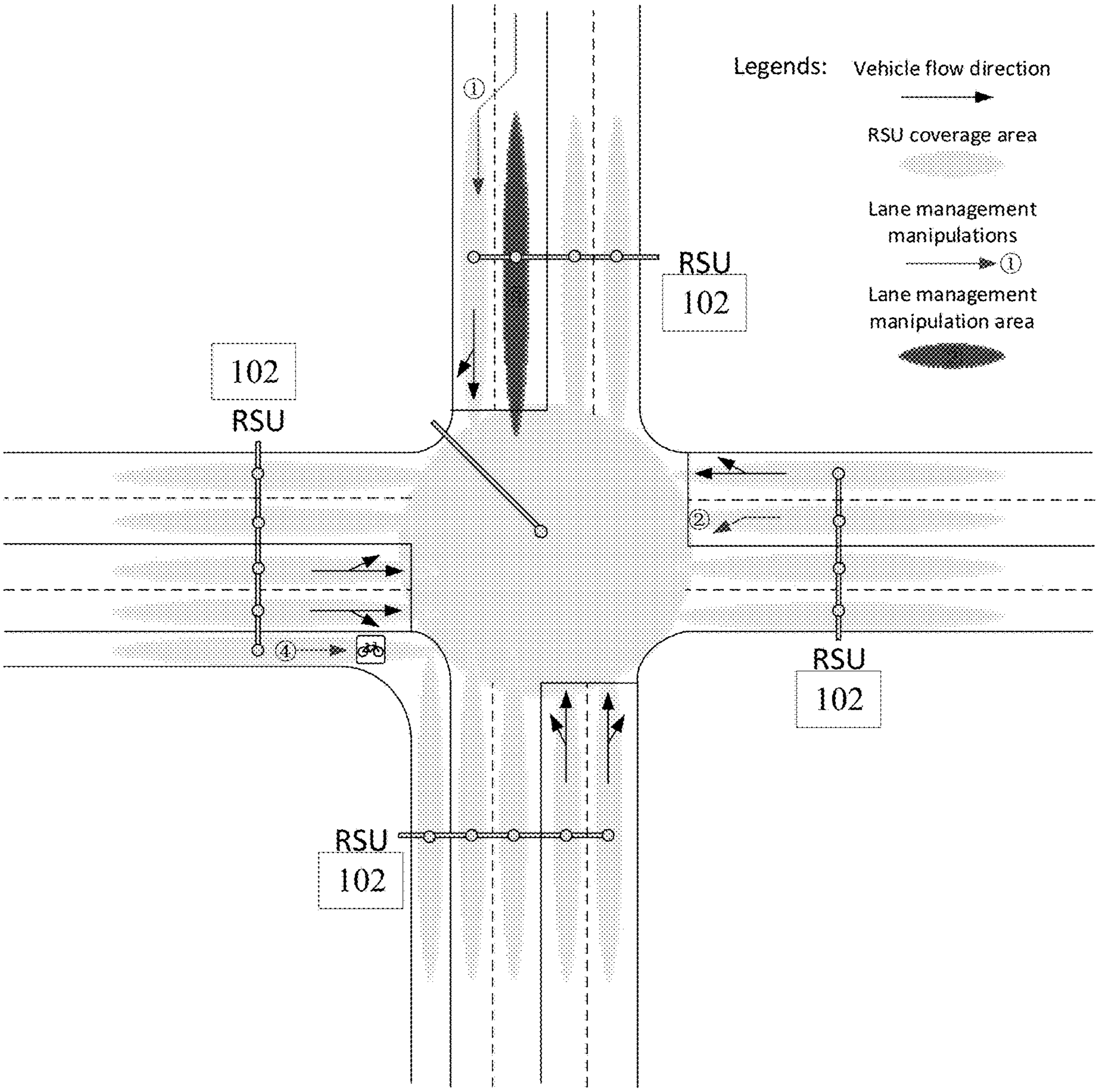

FIG. 22 shows exemplary RSU lane management on a typical urban intersection.

DETAILED DESCRIPTION

Exemplary embodiments of the technology are described below. It should be understood that these are illustrative embodiments and that the invention is not limited to these particular embodiments.

Figure 1:
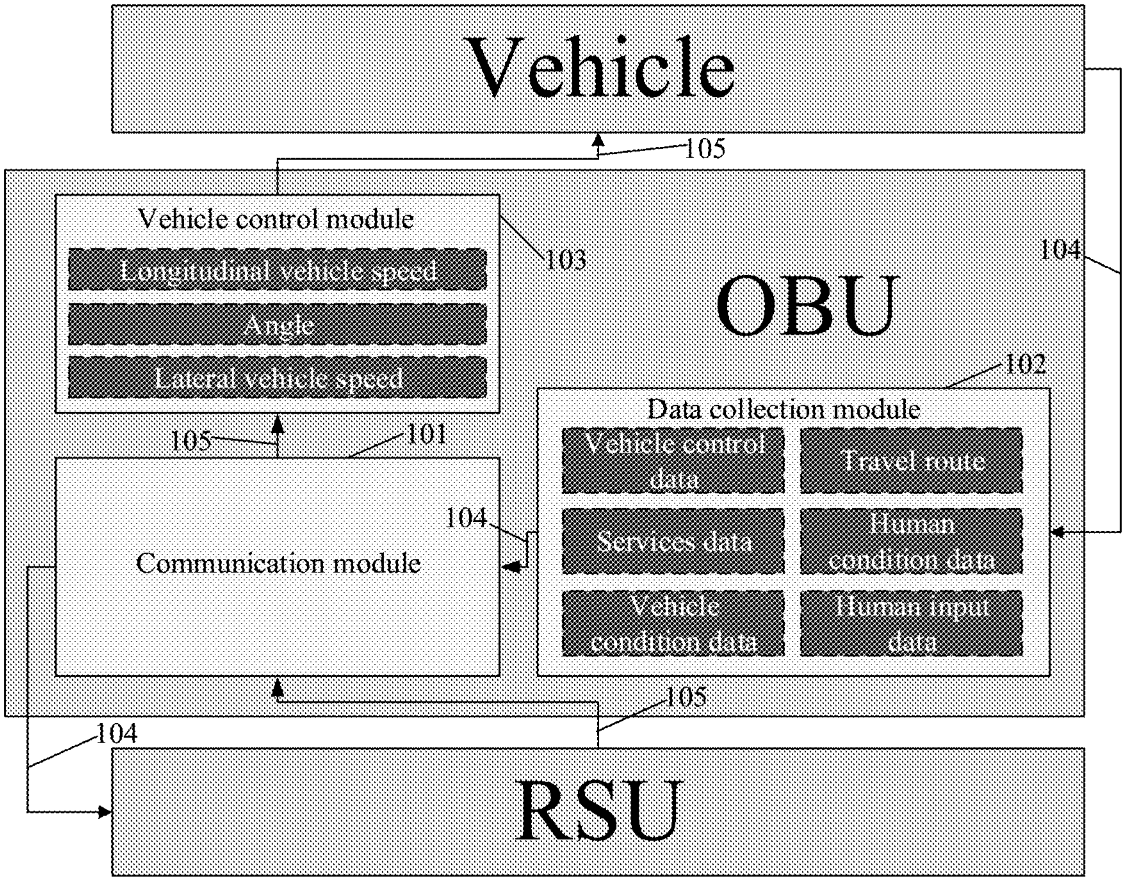

FIG. 1 shows an exemplary OBU containing a communication module 101, a data collection module 102, and a vehicle control module 103. The data collection module 102 collects data related to a vehicle and a human 104 and then sends it 104 to an RSU through communication module 101. Also, OBU can receive data of RSU 105 through communication module 101. Based on the data of RSU 105, the vehicle control module 103 helps control the vehicle.

Figure 2:
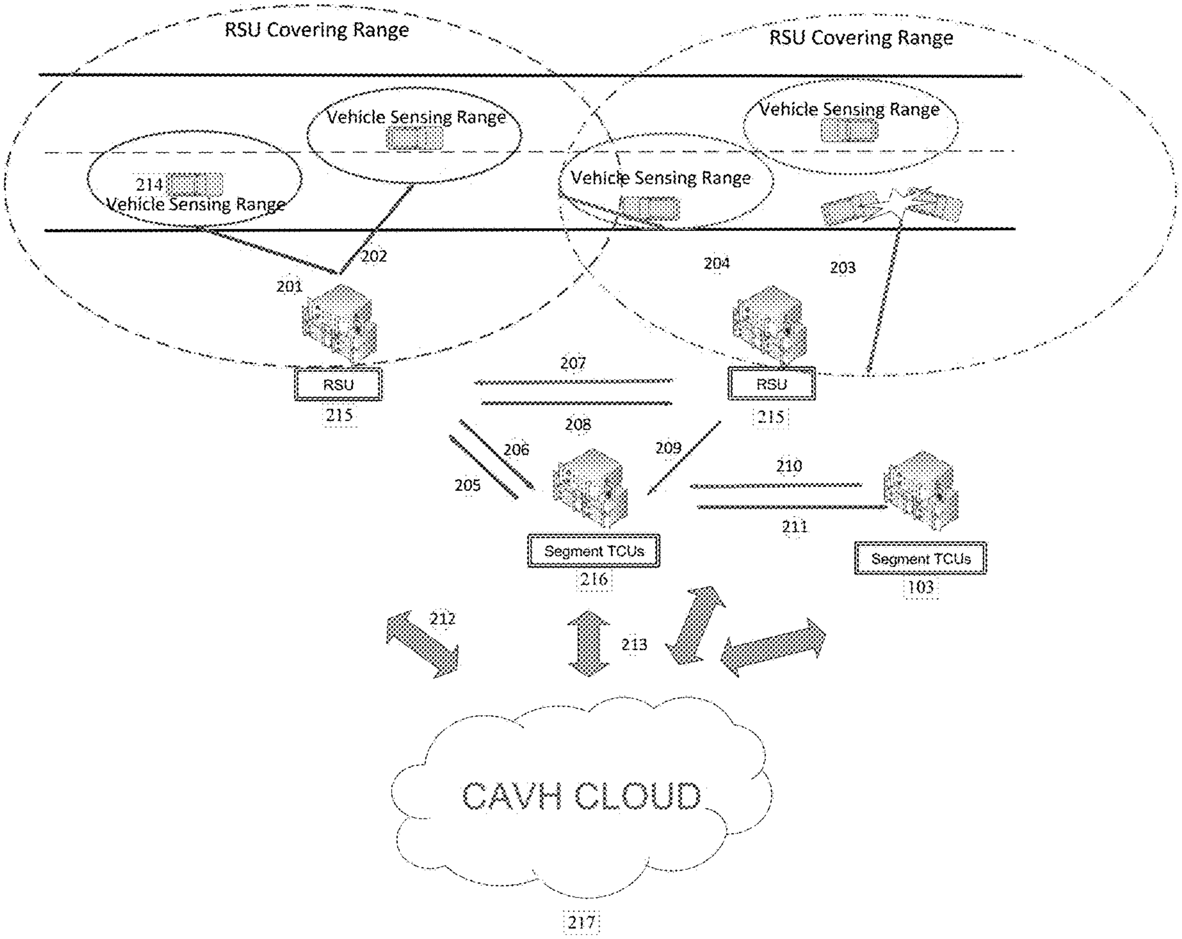

FIG. 2 illustrates an exemplary framework of a lane management sensing system and its data flow.

The RSU exchanges information between the vehicles and the road and communicates with TCUs, the information including weather information, road condition information, lane traffic information, vehicle information, and incident information.

Figure 3:
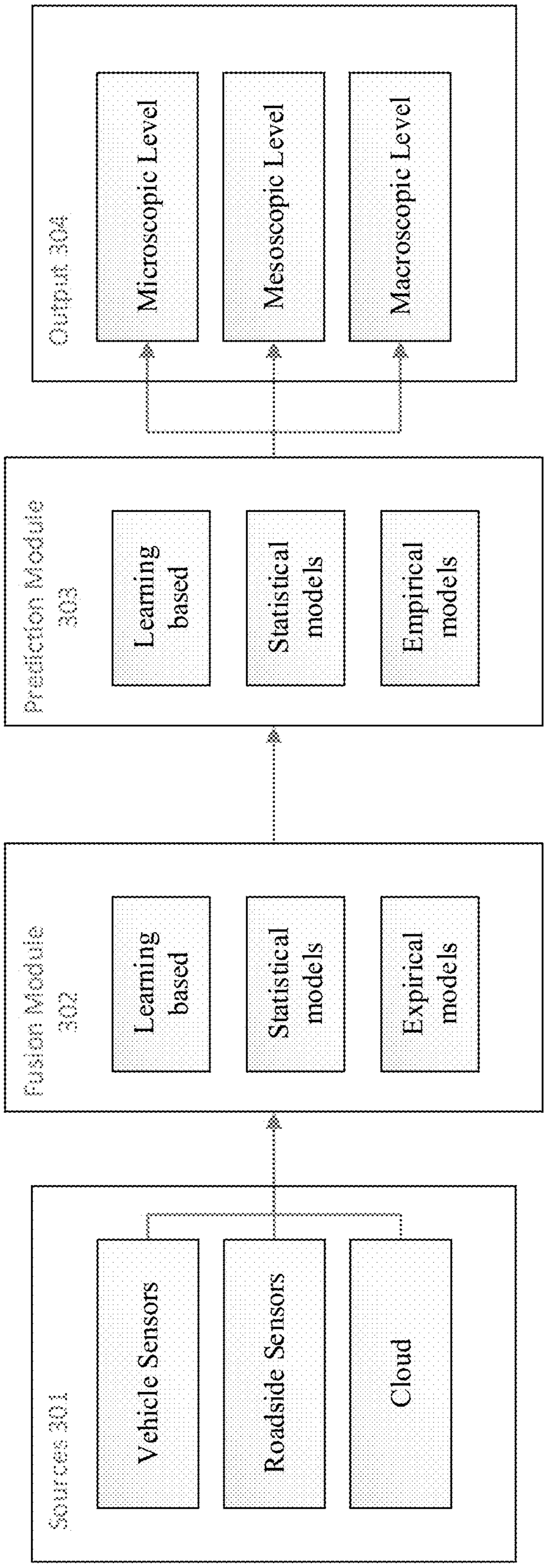

FIG. 3 illustrates exemplary workflow of a basic prediction process of a lane management sensing system and its data flow. In some embodiments, fused multi-source data collected from vehicle sensors, roadside sensors and the cloud is processed through models including but not limited to learning based models, statistical models, and empirical models. Then predictions are made at different levels including microscopic, mesoscopic, and macroscopic levels using emerging models including learning based, statistic based, and empirical models.

Figure 4:
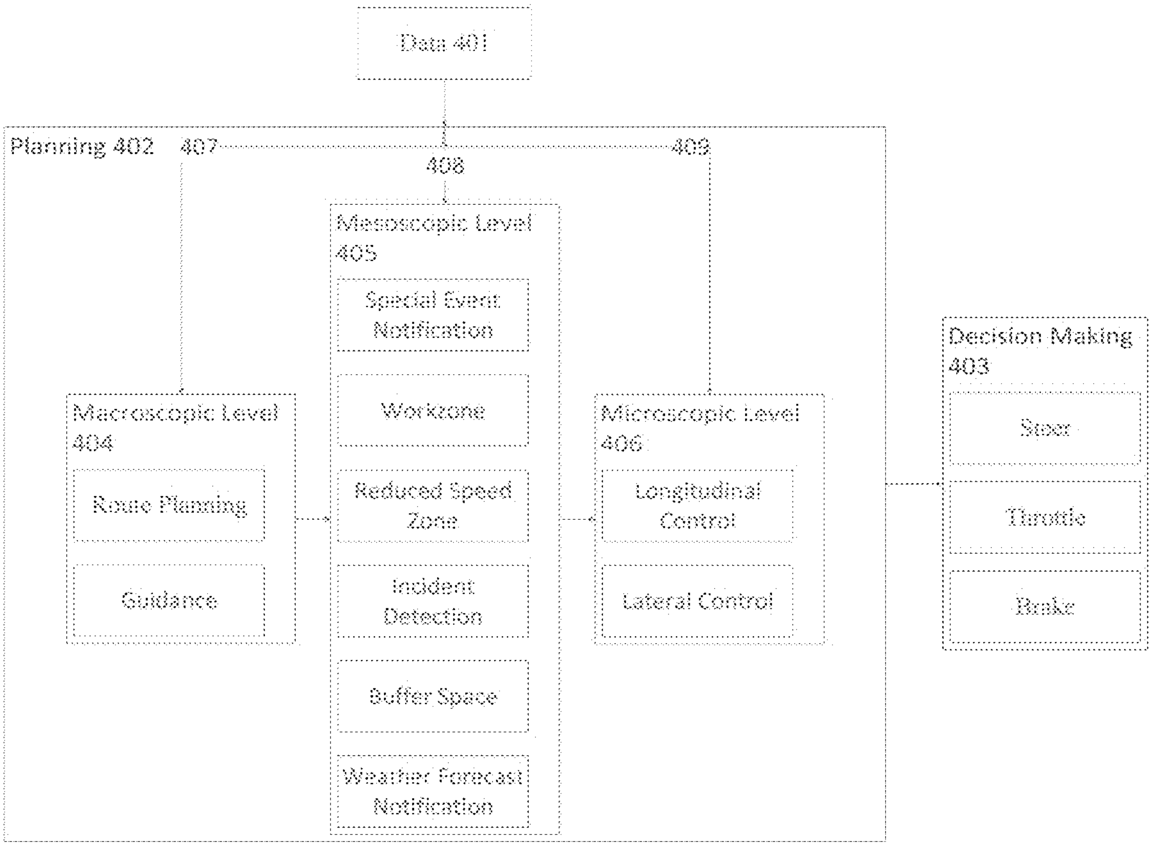

FIG. 4 shows exemplary planning and decision making processes in an IRIS. Data 401 is fed into planning module 402 according to three planning level respectively 407, 408, and 409. The three planning submodules retrieve corresponding data and process it for their own planning tasks. In a macroscopic level 404, route planning and guidance optimization are performed. In a mesoscopic level 405, special event, work zone, reduced speed zone, incident, buffer space, and extreme weather are handled. In a microscopic level 406, longitudinal control and lateral control are generated based on internal algorithm. After computing and optimization, all planning outputs from the three levels are produced and transmitted to decision making module 403 for further processing, including steering, throttle control, and braking.

Figure 5:
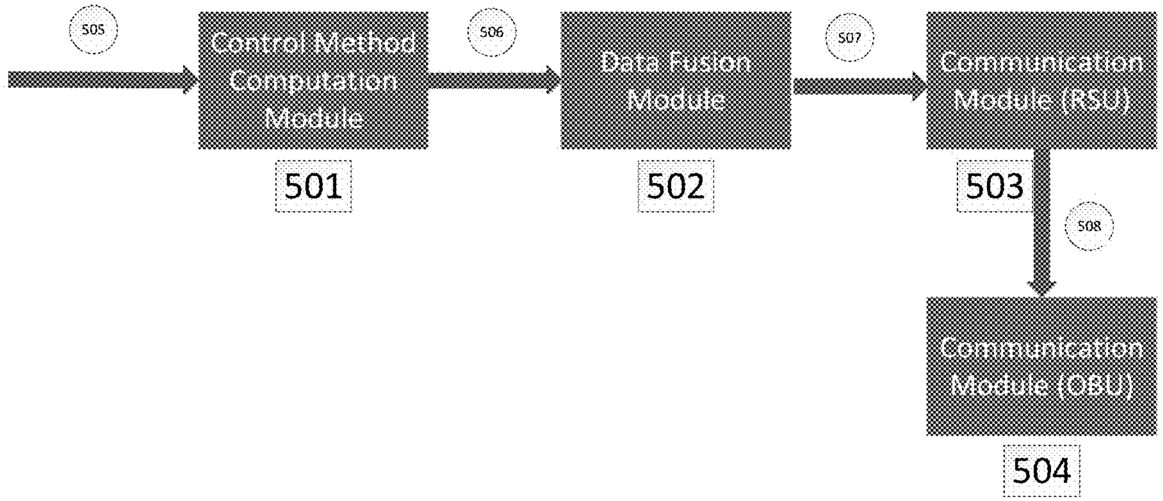
FIG. 5 shows an exemplary vehicle control flow component. 501: The planning and prediction module send the information to control method computation module. 502: Data fusion module receives the calculated results from different sensing devices. 503: Integrated data sent to the communication module of RSUs. 504: RSUs sends the control command to the OBUs.

FIG. 5 shows exemplary data flow of an infrastructure automation based control system. The control system calculates the results from all sensing detectors, conducts data fusion, and exchanges information between RSUs and Vehicles. The control system comprises: a) Control Method Computation Module 501; b) Data Fusion Module 502; c) Communication Module (RSU) 503; and d) Communication Module (OBU) 504.

Figure 6:
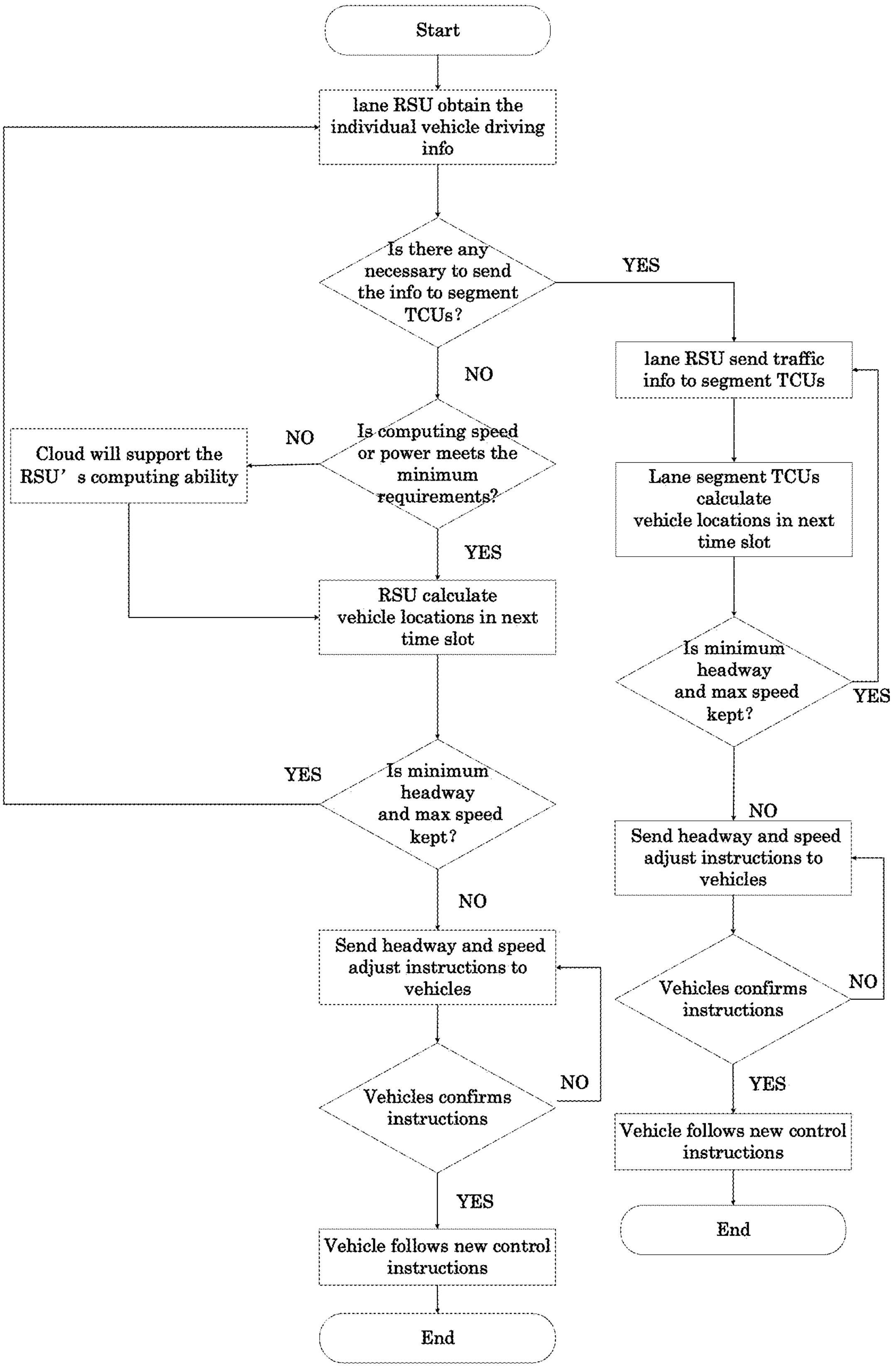
FIG. 6 shows an exemplary flow chart of longitudinal control.

FIG. 6 illustrates an exemplary process of vehicle longitudinal control. As shown in the figure, vehicles are monitored by the RSUs. If related control thresholds (e.g., minimum headway, maximum speed, etc.) are reached, the necessary control algorithms is triggered. Then the vehicles follow the new control instructions to drive. If instructions are not confirmed, new instructions are sent to the vehicles.

Figure 7:
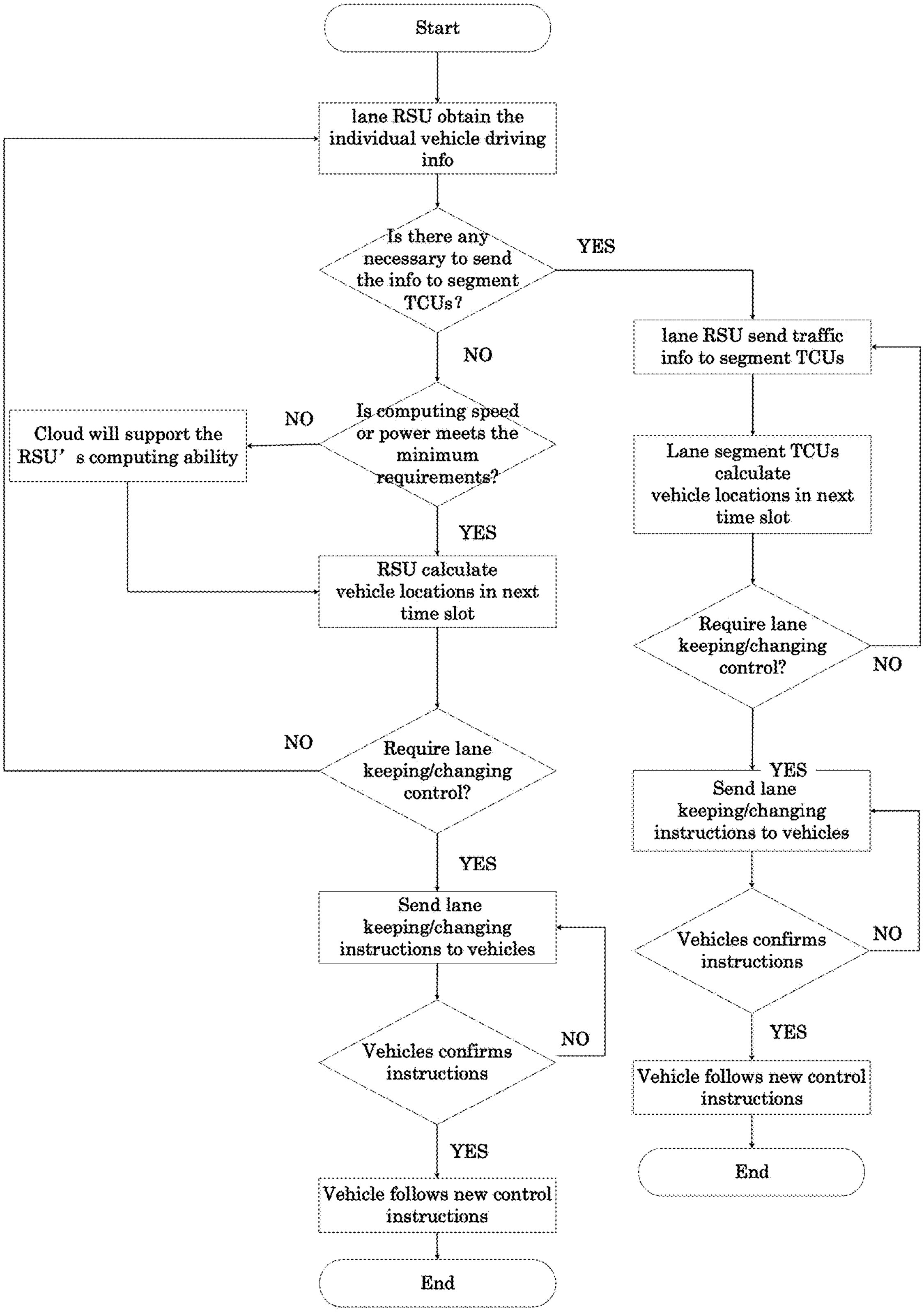
FIG. 7 shows an exemplary flow chart of latitudinal control.

FIG. 7 illustrates an exemplary process of vehicle latitudinal control. As shown in the figure, vehicles are monitored by the RSUs. If related control thresholds (e.g., lane keeping, lane changing, etc.) are reached, the necessary control algorithms are triggered. Then the vehicles follows the new control instructions to drive. If instructions are not confirmed, new instructions are sent to the vehicles.

Figure 8:
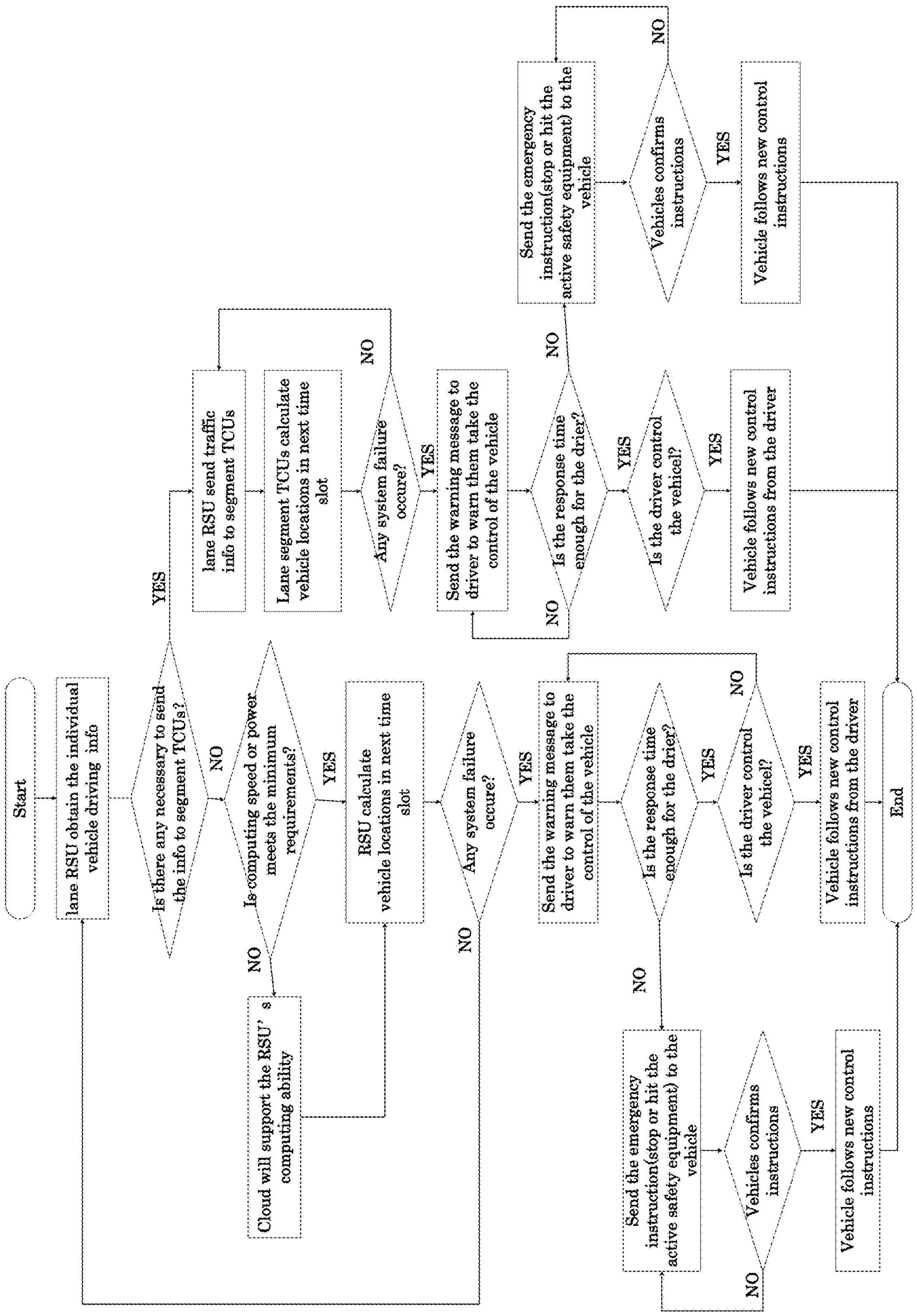
FIG. 8 shows an exemplary flow chart of fail-safe control.

FIG. 8 illustrates an exemplary process of vehicle fail safe control. As shown in the figure, vehicles are monitored by the RSUs. If an error occurs, the system sends the warning message to the driver to warn the driver to control the vehicle. If the driver does not make any response or the response time is not appropriate for driver to take the decision, the system sends the control thresholds to the vehicle. If related control thresholds (e.g., stop, hit the safety equipment, etc.) are reached, the necessary control algorithms is triggered. Then the vehicles follows the new control instructions to drive. If instructions are not confirmed, new instructions are sent to the vehicles.

FIG. 9 shows an exemplary physical component of a typical RSU, comprising a Communication Module, a Sensing Module, a Power Supply Unit, an Interface Module, and a Data Processing Module. The RSU may any of variety of module configurations. For example, for the sense module, a low cost RSU may only include a vehicle ID recognition unit for vehicle tracking, while a typical RSU includes various sensors such as LiDAR, cameras, and microwave radar.

FIG. 10 shows an exemplary internal data flow within a RSU. The RSU exchanges data with the vehicle OBUs, upper level TCU and the cloud. The data processing module includes two processors: external object calculating Module (EOCM) and AI processing unit. EOCM is for traffic object detection based on inputs from the sensing module and the AI processing unit focuses more on decision-making processes.

FIG. 11 show an exemplary structure of a TCC/TCU network. A macroscopic TCC, which may or may not collaborate with an external TOC, manages a certain number of regional TCCs in its coverage area. Similar, a regional TCC manages a certain number of corridor TCCs, a corridor TCC manages a certain number of segment TCUs, a segment TCU manages a certain number of point TCUs, and a point TCUs manages a certain number of RSUs. An RSU sends customized traffic information and control instructions to vehicles and receives information provided by vehicles. The network is supported by the services provided by the cloud.

FIG. 12 shows how an exemplary cloud system communicates with sensors of RSU, TCC/TCU (1201) and TOC through communication layers (1202). The cloud system contains cloud infrastructure (1204), platform (1205), and application service (1206). The application services also support the applications (1203).

FIG. 13 shows exemplary data collected from sensing module 1301 such as image data, video data, and vehicle status data. The data is divided into two groups by the data allocation module 1302: large parallel data and advanced control data. The data allocation module 1302 decides how to assign the data 1309 with the computation resources 1303, which are graphic processing units (GPUs) 1304 and central processing units (CPUs) 1305. Processed data 1310 is sent to prediction 1306, planning 1307, and decision making modules 1308. The prediction module provides results to the planning module 1311, and the planning module provides results 1312 to the decision making module.

FIG. 14 shows how exemplary data collected from OBUs and RSUs together with control targets and traffic information from upper level IRIS TCC/TCC network 1402 are provided to a TCU. The lane management module of a TCU produces lane management and vehicle control instructions 1403 for a vehicle control module and lane control module.

FIG. 15 shows exemplary data flow for vehicle control in adverse weather. Table 1, below, shows approaches for measurement of adverse weather scenarios.

TABLE 1

IRIS Measures for Adverse Weather Scenarios

| | Normal autonomous vehicle(only sensors) | | | IRIS HDMap + TOC + RSU(Camera + Radar + Lidar)/OBU can greatly mitigate the impact of adverse weather. | | |
|---|---|---|---|---|---|---|
| | Camera | | | | | |
| Impact in adverse weather | Visibility of lines/ signs/objects degraded. | Radar Detecting distance degraded. | Lidar Detecting distance degraded. | Solution for degrade of visibility. | Solution for degrade of distance detection. | Enhancement for vehicle control. |
| Rain | ** | ** | ** | HDMap provides info of lane/line/ sign/geometry, which enhance RSU's vision. | RSU has a whole vision of all vehicles on the road, so the chance of crash with other vehicles are eliminated. | RSU can control vehicle according to weather (e.g., lower the speed on icy road). |
| Snow | *** | ** | ** | | | |
| Fog | **** | **** | **** | | | |
| Sandstorm | **** | **** | **** | | | |

Number of "*" means the degree of decrease.

Frequency Band: 5 GHz
Doppler Spread: 800 km/h
Delay Spread: 1500 ns
Power Supply: 12/24V b) Data collection module Hardware technical Specifications
Intuitive PC User Interface for functions such as configuration, trace, transmit, filter, log etc.
High data transfer rate FIG. 16 shows exemplary IRIS security measures, including network security and physical equipment security. Network security is enforced by firewalls 1601 and periodically complete system scans at various levels. These firewalls protect data transmission 1605 either between the system and an Internet 1601 or between data centers 1603 and local servers 1604. For physical equipment security, the hardware is safely installed and secured by an identification tracker and possibly isolated.

In FIG. 17, periodically, IRIS system components 1704 back up the data to local storage 1703 in the same Intranet 1702 through firewall 1601. In some embodiments, it also uploads backup copy through firewall 1601 to the Cloud 1701, logically locating in the Internet 1702.

FIG. 18 shows an exemplary periodic IRIS system check for system failure. When failure happens, the system fail handover mechanism is activated. First, failure is detected and the failed node is recognized. The functions of failed node are handed over to shadow system and success feedback is sent back to an upper level system if nothing goes wrong. Meanwhile, a failed system/subsystem is restarted and/or recovered from a most recent backup. If successful, feedback is reported to an upper level system. When the failure is addressed, the functions are migrated back to the original system.

Exemplary hardware and parameters that find use in embodiments of the present technology include, but are not limited to the following:

OBU:

a) Communication module Technical Specifications
Standard Conformance: IEEE 802.11p-2010
Bandwidth: 10 MHz
Data Rates: 10 Mbps
Antenna Diversity CDD Transmit Diversity
Environmental Operating Ranges: −40° C. to +55° C.

c) Software technical Specifications
Tachograph Driver alerts and remote analysis.
Real-Time CAN BUS statistics.
CO2 Emissions reporting.

d) Vehicle control module Technical Specifications
Low power consumption
Reliable longitudinal and lateral vehicle control RSU Design a) communication module which include three communication channels:
Communication with vehicles including DSRC/4G/5G (e.g., MK5 V2X from Cohda Wireless)
Communication with point TCUs including wired/wireless communication (e.g., Optical Fiber from Cablesys)
Communication with cloud including wired/wireless communication with at least 20M total bandwidth b) data Processing Module which include two processors:
External Object Calculating Module (EOCM)
Process Object detection using Data from the sensing module and other necessary regular calculation (e.g., Low power fully custom ARM/X86 based processor)
AI processing Unit
Machine learning
Decision making/planning and prediction processing c) an interface Module:
FPGA based Interface unit FPGA processor that acts like a bridge between the AI processors and the External Object Calculating Module processors and send instructions to the communication modules The RSU deployment a. Deployment location The RSU deployment is based on function requirement and road type. An RSU is used for sensing, communicating, and controlling vehicles on the roadway to provide automation. Since the LIDAR and other sensors (like loop detectors) need different special location, some of them can be installed separately from the core processor of RSU.

Two exemplary types of RSU location deployment type:

i. Fixed location deployment. The location of this type of RSU are fixed, which is used for serving regular roadways with fixed traffic demand on the daily basis.

ii. Mobile deployment. Mobile RSU can be moved and settled in new place and situation swiftly, is used to serve stochastic and unstable demand and special events, crashes, and others. When an event happens, those mobile RSU can be moved to the location and perform its functions.

b. Method for coverage

The RSUs may be connected (e.g., wired) underground. RSUs are mounted on poles facing down so that they can work properly. The wings of poles are T-shaped. The roadway lanes that need CAVH functions are covered by sensing and communication devices of RSU. There are overlaps between coverage of RSUs to ensure the work and performance.

c. Deployment Density

The density of deployment depends on the RSU type and requirement. Usually, the minimum distance of two RSU depends on the RSU sensors with minimum covering range.

d. Blind spot handling

There may be blind sensing spots causing by vehicles blocking each other. The issue is common and especially serious when spacing between vehicles are close. A solution for this is to use the collaboration of different sensing technologies from both RSUs deployed on infrastructures and OBUs that are deployed on vehicles.

This type of deployment is meant to improve traffic condition and control performance, under certain special conditions. Mobile RSU can be brought by agents to the deployment spot. In most cases, due to the temporary use of special RSUs, the poles for mounting are not always available. So, those RSU may be installed on temporary frames, buildings along the roads, or even overpasses that are location-appropriate.

Certain exemplary RSU configurations are shown in FIGS. 19-22. FIG. 19 shows a sectional view of an exemplary RSU deployment. FIG. 20 shows an exemplary top view of an RSU deployment. In this road segment, sensing is covered by two types of RSU: 901 RSU A: camera groups, the most commonly used sensors for objects detection; and 902 RSU B: LIDAR groups, which makes 3D representation of targets, providing higher accuracy. Cameras sensor group employ a range that is lower than LIDAR, e.g. in this particular case, below 150 m, so a spacing of 150 m along the roads for those camera groups. Other type of RSUs have less requirement on density (e.g., some of them like LIDAR or ultrasonic sensors involve distances that can be greater).

FIG. 21 shows an exemplary RSU lane management configuration for a freeway segment. The RSU sensing and communication covers each lane of the road segment to fulfill the lane management functions examples (showed in red arrows in figure) including, but not limited to: 1) Lane changing from one lane to another; 2) Merging manipulations from an onramp; 3) Diverging manipulations from highway to offramp; 4) Weaving zone management to ensure safety; and 5) Revisable lane management.

FIG. 22 shows an exemplary lane management configuration for a typical urban intersection. The RSU sensing and communication covers each corner of the intersection to fulfill the lane management functions examples (showed in red in figure) including: 1) Lane changing from one lane to another; 2) Movement management (exclusive left turns in at this lane); 3) Lane closure management at this leg; and 4) Exclusive bicycle lane management.

We claim:

1. A system comprising a road side unit (RSU) network that comprises a plurality of networked communication devices spaced along a roadway, wherein the RSU network is configured to:

1) Predict traffic behavior for individual vehicles at a microscopic level;
2) communicate with:
   a) a traffic control unit (TCU) comprising an automated or semi-automated computational module, wherein the TCU:
      provides data gathering, information processing, network optimization, and/or traffic control;
      communicates with and manages information from a plurality of RSU networks; and
      communicates with and is managed by a traffic control center (TCC); and
   b) on board units (OBUs) of a plurality of vehicles traveling on said roadway; and
3) send vehicle-specific control instructions to vehicle OBUs, wherein said vehicle-control instructions comprise instructions for vehicle longitudinal and lateral position; vehicle speed; and vehicle steering and control.

2. The system of claim 1 wherein each RSU of said RSU network comprises a radar-based sensor, a vision-based sensor, a satellite-based navigation component, and/or a vehicle identification component; and said RSU network is configured to sense vehicles on a road.

3. The system of claim 1 wherein each RSU of the RSU network comprises a sensing module, a communication module, a data processing module, an interface module, and an adaptive power supply module.

4. The system of claim 1 wherein the RSUs of the RSU network are deployed at spacing intervals within a range of 50 to 500 meters.

5. The system of claim 1 wherein said RSU network is configured to provide high-resolution maps comprising lane width, lane approach, grade, and road geometry information to vehicles.

6. The system of claim 1 wherein said RSU network is configured to collect information comprising weather information, road condition information, lane traffic information, vehicle information, and/or incident information; and to broadcast said information to vehicles and/or to the TCU network.

7. The system of claim 1 wherein said RSU network is configured to communicate with a cloud database.

8. The system of claim 1 wherein said RSU network is configured to provide data to OBUs, said data comprising vehicle control instructions, travel route and traffic information, and services data.

9. The system of claim 1 wherein said RSU network comprises RSUs installed at one or more fixed locations selected from the group consisting of a freeway roadside, freeway on/off ramp, intersection, roadside building, bridge, tunnel, roundabout, transit station, parking lot, railroad crossing, and/or school zone.

10. The system of claim 1 wherein said RSU network comprises RSUs installed at one or more mobile platforms selected from the group consisting of vehicles and unmanned aerial drones.

11. The system of claim 1 wherein said RSU network is configured to: communicate with said TCU network in real-time over wired and/or wireless channels; and/or communicate with said OBUs in real-time over wireless channels.

12. The system of claim 2 wherein said satellite based navigation system component is configured to communicate with OBUs and locate vehicles.

13. The system of claim 1 wherein said microscopic level is a range of time from 1 to 10 milliseconds.

14. The system of claim 1 wherein an RSU of the RSU network predicts longitudinal movements and lateral movements for individual vehicles.

15. The system of claim 14 wherein the longitudinal movements comprise car following, acceleration and deceleration, and stopping and standing; and the lateral movements comprise lane keeping and lane changing.

16. The system of claim 1 wherein the RSU network is configured to predict traffic behavior for individual vehicles using data from at least one of the roadside sensors, vehicle sensors, and a cloud database.

17. The system of claim 1 wherein the RSU network comprises a prediction module providing learning, statistical analysis, and empirical algorithms.

18. The system of claim 17 wherein the RSU network further comprises a planning module and the prediction module provides results to the planning module.

19. The system of claim 1 wherein the RSU network is configured to predict incidents and send control instructions to drive vehicles to safety; and to coordinate related agencies for further actions.

20. A system comprising a road side unit (RSU) network that comprises a plurality of networked communication devices spaced along a roadway, wherein each RSU of the RSU network comprises a sensing module, a communication module, a data processing module, an interface module, and an adaptive power supply module; and the RSU network is configured to predict traffic behavior for individual vehicles at a microscopic level; and to communicate with:

a) a traffic control unit (TCU) comprising an automated or semi-automated computational module,
   wherein the TCU:
   - provides data gathering, information processing, network optimization, and/or traffic control;
   - communicates with and manages information from a plurality of RSU networks; and
   - communicates with and is managed by a traffic control center (TCC); and b) on board units (OBUs) of a plurality of vehicles traveling on said roadway.

21. The system of claim 20 wherein said RSU network is configured to send vehicle-specific control instructions to vehicle OBUs, wherein said vehicle-control instructions comprise instructions for vehicle longitudinal and lateral position; vehicle speed; and vehicle steering and control.

22. The system of claim 20 wherein each RSU of said RSU network comprises a radar-based sensor, a vision-based sensor, a satellite-based navigation component, and/or a vehicle identification component; and said RSU network is configured to sense vehicles on a road.

23. The system of claim 20 wherein the RSUs of the RSU network are deployed at spacing intervals within a range of 50 to 500 meters.

24. The system of claim 20 wherein said RSU network is configured to provide high-resolution maps comprising lane width, lane approach, grade, and road geometry information to vehicles.

25. The system of claim 20 wherein said RSU network is configured to collect information comprising weather information, road condition information, lane traffic information, vehicle information, and/or incident information; and to broadcast said information to vehicles and/or to the TCU network.

26. The system of claim 20 wherein said RSU network is configured to communicate with a cloud database.

27. The system of claim 20 wherein said RSU network is configured to provide data to OBUs, said data comprising vehicle control instructions, travel route and traffic information, and services data.

28. The system of claim 20 wherein said RSU network comprises RSUs installed at one or more fixed locations selected from the group consisting of a freeway roadside, freeway on/off ramp, intersection, roadside building, bridge, tunnel, roundabout, transit station, parking lot, railroad crossing, and/or school zone.

29. The system of claim 20 wherein said RSU network comprises RSUs installed at one or more mobile platforms selected from the group consisting of vehicles and unmanned aerial drones.

30. The system of claim 20 wherein said RSU network is configured to: communicate with said TCU network in real-time over wired and/or wireless channels; and/or communicate with said OBUs in real-time over wireless channels.

31. The system of claim 22 wherein said satellite based navigation system component is configured to communicate with OBUs and locate vehicles.

32. The system of claim 20 wherein said microscopic level is a range of time from 1 to 10 milliseconds.

33. The system of claim 20 wherein an RSU of the RSU network predicts longitudinal movements and lateral movements for individual vehicles.

34. The system of claim 33 wherein the longitudinal movements comprise car following, acceleration and deceleration, and stopping and standing; and the lateral movements comprise lane keeping and lane changing.

35. The system of claim 20 wherein the RSU network is configured to predict traffic behavior for individual vehicles using data from at least one of the roadside sensors, vehicle sensors, and a cloud database.

36. The system of claim 20 wherein the RSU network comprises a prediction module providing learning, statistical analysis, and empirical algorithms.

37. The system of claim 36 wherein the RSU network further comprises a planning module and the prediction module provides results to the planning module.

38. The system of claim 20 wherein the RSU network is configured to predict incidents and send control instructions to drive vehicles to safety; and to coordinate related agencies for further actions.

* * * * *